United States Patent
Lee et al.

(10) Patent No.: US 12,286,367 B2
(45) Date of Patent: Apr. 29, 2025

(54) ION REMOVAL UNIT FOR WATER HEATER, AND SCALE-FREE BOILER, SCALE-FREE WATER HEATER, AND PORTABLE ION REMOVER INCLUDING THE SAME

(71) Applicant: KYUNGDONG NAVIEN CO., LTD., Gyeonggi-do (KR)

(72) Inventors: Soo Young Lee, Seoul (KR); Jun Kyu Park, Seoul (KR); Gu Min Lim, Seoul (KR)

(73) Assignee: Kyungdong Navien Co., Ltd., Gyeonggi-do (KR)

( * ) Notice: Subject to any disclaimer, the term of this patent is extended or adjusted under 35 U.S.C. 154(b) by 747 days.

(21) Appl. No.: 16/650,908

(22) PCT Filed: Sep. 27, 2018

(86) PCT No.: PCT/KR2018/011360
§ 371 (c)(1),
(2) Date: Mar. 26, 2020

(87) PCT Pub. No.: WO2019/066452
PCT Pub. Date: Apr. 4, 2019

(65) Prior Publication Data
US 2020/0290899 A1    Sep. 17, 2020

(30) Foreign Application Priority Data

Sep. 27, 2017  (KR) .......................... 10-2017-0124784
Dec. 28, 2017  (KR) .......................... 10-2017-0182907

(51) Int. Cl.
C02F 1/469        (2023.01)
C02F 1/00         (2023.01)
(Continued)

(52) U.S. Cl.
CPC ............ *C02F 1/4695* (2013.01); *C02F 1/008* (2013.01); *C02F 5/08* (2013.01); *F24D 19/00* (2013.01); *C02F 2101/10* (2013.01); *C02F 2201/005* (2013.01); *C02F 2303/16* (2013.01)

(58) Field of Classification Search
CPC .......... C02F 1/4695; C02F 1/008; C02F 1/02; C02F 1/4693; C02F 1/4691; C02F 1/469;
(Continued)

(56) References Cited

U.S. PATENT DOCUMENTS 4,309,982 A     1/1982   Quidham
2005/0161342 A1 7/2005   Carson et al.
(Continued)

FOREIGN PATENT DOCUMENTS

JP    H59-118947 U    8/1984
JP    H06-241564 A    8/1994
(Continued)

OTHER PUBLICATIONS

JP 2000314555A English description, Nov. 2000, Tokunaga Koji.*
(Continued)

*Primary Examiner* — Akash K Varma

(57) ABSTRACT

A scale-free boiler of the present disclosure includes a boiler case, a main flow path disposed inside the boiler case and in communication with a heating flow path disposed outside the boiler case to provide heating, a heat source for heating water flowing along the main flow path, and a filter for removing, based on an electrical force, an ionic material contained in the water flowing along the main flow path or water to be supplied to the main flow path to prevent occurrence of scale.

16 Claims, 13 Drawing Sheets

(51) Int. Cl.
*C02F 5/08* (2023.01)
*F24D 19/00* (2006.01)
*C02F 101/10* (2006.01)

(58) Field of Classification Search
CPC .... C02F 1/42; C02F 1/463; C02F 1/00; C02F 5/08; C02F 2101/10; C02F 2201/005; C02F 2303/16; C02F 2303/22; C02F 2209/10; C02F 2209/40; C02F 2301/043; A47K 3/00; F22B 37/48; F22B 37/54; F24D 19/00; F24D 19/0092; F24D 19/1024; F24D 19/10; F24D 2220/0235; F24D 3/00; F24D 3/12; F24H 9/2035; F24H 9/0042; F24H 9/00; F24H 9/20; F24H 1/48; F24H 1/10; F24H 1/22; F24H 8/006
USPC .......................................................... 204/630
See application file for complete search history.

(56) References Cited

U.S. PATENT DOCUMENTS

| | | | |
|---|---|---|---|
| 2011/0042205 A1* | 2/2011 | Kim | ............... C02F 1/4691 |
| | | | 204/252 |
| 2012/0227681 A1* | 9/2012 | Min | ............... F24H 9/13 |
| | | | 122/13.3 |
| 2015/0225258 A1 | 8/2015 | Uno et al. | |

FOREIGN PATENT DOCUMENTS

| | | | |
|---|---|---|---|
| JP | H07-043444 | 8/1995 | |
| JP | H11-128625 A | 5/1999 | |
| JP | 2000314555 A * | 11/2000 | ............... F24H 1/10 |
| JP | 2001-336821 A | 12/2001 | |
| JP | 3502708 B2 | 3/2004 | |
| JP | 3748340 B2 | 2/2006 | |
| JP | 2014-133228 A | 7/2014 | |
| KR | 10-1995-0014785 A | 6/1995 | |
| KR | 10-1999-0064658 A | 8/1999 | |
| KR | 10-2003-0094942 A | 12/2003 | |
| KR | 10-2005-0104053 A | 11/2005 | |
| KR | 10-2009-0100553 A | 9/2009 | |
| KR | 10-2010-0106183 A | 10/2010 | |
| KR | 10-2013-0052085 A | 5/2013 | |
| KR | 10-2014-0111091 A | 9/2014 | |
| KR | 10-2017-0062250 A | 6/2017 | |
| KR | 10-2017-0074067 A | 6/2019 | |
| KR | 10-2012-0102836 A | 9/2020 | |
| WO | 2003-091165 A1 | 11/2003 | |

OTHER PUBLICATIONS

Notice of Allowance mailed May 22, 2020; Korean Patent Application No. 10-2017-0182907, in the name of Kyungdong Navien Co., Ltd.

* cited by examiner

ION REMOVAL UNIT FOR WATER HEATER, AND SCALE-FREE BOILER, SCALE-FREE WATER HEATER, AND PORTABLE ION REMOVER INCLUDING THE SAME

CROSS REFERENCE TO RELATED APPLICATIONS

This application is a national phase nonprovisional application of and claims priority from PCT/KR2018/011360 filed on Sep. 27, 2018, which claims the benefit of Korean Patent Application No. 10-2017-0182-07, filed in the Korean Intellectual Property Office on Dec. 28, 2017 and Korean Patent Application No. 10-2017-0124784, filed in the Korean Intellectual Property Office on Sep. 27, 2017. The foregoing applications are incorporated in their entirety herein by reference.

TECHNICAL FIELD

The present disclosure relates to an ion removal unit for a water heater, and a scale-free boiler, a scale-free water heater, and a portable ion remover including the same.

BACKGROUND ART

A water heater, such as a boiler, a hot water supplier, and the like, may receive water and heat the water to provide heating or hot water. However, the water such as tap water and the like supplied to the water heater usually contains calcium ions. The calcium ion in the water may precipitate as calcium carbonate in a space resulted from heat or bubbles generated by the heat. The precipitated calcium carbonate may be fixed to an inner wall of a pipe, a heat exchanger, or the like of the water heater. Because of such fixation, a crack may occur in the pipe, the heat exchanger, or the like. This results in deterioration of durability or reduction of a life of the water heater. In spite of such a problem, until now, a technology for preventing occurrence of scale as described above has not been developed.

Technical Problem

Embodiments of the present disclosure is to prevent occurrence of scale thereby increasing durability and extending a life of a water heater.

Technical Solution

According to an exemplary embodiment, a scale-free boiler includes a boiler case, a main flow path disposed inside the boiler case and in communication with a heating flow path disposed outside the boiler case to provide heating, a heat source for heating water flowing along the main flow path, and a filter for removing, based on an electrical force, an ionic material contained in the water flowing along the main flow path or water to be supplied to the main flow path to prevent occurrence of scale.

According to an exemplary embodiment, the filter may selectively activate one of a removal mode for removing the ionic material in the water through an electrode and a regeneration mode for regenerating the electrode.

According to an exemplary embodiment, the filter may remove the ionic material in a capacitive deionization scheme in the removal mode.

According to an exemplary embodiment, the scale-free boiler may further include a first flow path for communicating the main flow path and an inlet of the filter with each other, and a second flow path for communicating the main flow path and an outlet of the filter with each other on a downstream side when compared with the first flow path with respect to a flow direction of the water flowing along the main flow path, wherein the water may flow into the filter from the main flow path through the first flow path in the removal mode, and return to the main flow path from the filter through the second flow path after the removal of the ionic material by the filter.

According to an exemplary embodiment, the scale-free boiler may further include a drain flow path for communicating the inlet of the filter and the outside of the boiler case with each other, wherein the water may flow into the filter from the main flow path through the second flow path in the regeneration mode, and drain from the filter through the drain flow path together with the ionic material desorbed from the electrode of the filter.

According to an exemplary embodiment, the scale-free boiler may further include a drain flow path for communicating the outlet of the filter and the outside of the boiler case with each other, wherein the water may flow into the filter from the main flow path through the first flow path in the regeneration mode, and drain from the filter through the drain flow path together with the ionic material desorbed from the electrode of the filter.

According to an exemplary embodiment, the scale-free boiler may further include a first valve assembly for bypassing at least a portion of the water flowing along the main flow path to the first flow path, and a controller that controls the first valve assembly, wherein the controller may control the first valve assembly such that the bypass of the water continues except during the regeneration mode until an amount of an ionic material in water flowing along the first flow path or flowing along the main flow path before being bypassed to the first flow path is decreased to a preset target amount.

According to an exemplary embodiment, the scale-free boiler may further include a sensing device disposed on the first flow path or on the main flow path at an upstream side when compared with a connection point of the first flow path and the main flow path, wherein the sensing device may sense a TDS (total dissolved solid) of the water flowing along the first flow path or along the main flow path to obtain the amount of the ionic material in the water.

According to an exemplary embodiment, the scale-free boiler may further include a first valve assembly for bypassing at least a portion of the water flowing along the main flow path to the first flow path, and controlling a bypass flow rate, being a flow rate of the water bypassed to the first flow path, and a controller that controls the first valve assembly.

According to an exemplary embodiment, the controller may adjust the bypass flow rate based on a removal rate defined by an equation below through control for the first valve assembly.

$$\text{Removal rate} = \frac{A_{in} - A_{out}}{A_{in}}$$

(where $A_{in}$ is an amount of an ionic material in water flowing along the first flow path, and $A_{out}$ is an amount of an ionic material in water flowing along the second flow path)

According to an exemplary embodiment, the controller may decrease the bypass flow rate by controlling the first valve assembly to increase the removal rate, or increase the bypass flow rate by controlling the first valve assembly to decrease the removal rate.

According to an exemplary embodiment, the controller may adjust the bypass flow rate based on a residual amount, which is an amount of an ionic material in water discharged from the filter and flowing along the second flow path through the control of the first valve assembly.

According to an exemplary embodiment, the controller may decrease the bypass flow rate by controlling the first valve assembly to decrease the residual amount, or increase the bypass flow rate by controlling the first valve assembly to increase the residual amount.

According to an exemplary embodiment, the scale-free boiler may further include a pump for forcing a flow of the water in the main flow path, wherein the pump may be disposed on the main flow path to be adjacent to the first flow path on an upstream side when compared with the first flow path with respect to the flow direction of the water.

According to an exemplary embodiment, the scale-free boiler may further include a first flow path for communicating the main flow path and an inlet of the filter with each other, a second flow path for communicating the main flow path and an outlet of the filter with each other, a pump for forcing a flow of the water in the main flow path, and a heat exchanger for heating the water in the main flow path, wherein the heat exchanger may be located on a downstream side of the pump with respect to a flow direction of the water flowing along the main flow path, wherein the first flow path may be in communication with the main flow path at a position at the downstream side of the pump and an upstream side of the heat exchanger, and wherein the second flow path may be in communication with the main flow path at a position at a downstream side of the heat exchanger but an upstream side of the pump.

According to an exemplary embodiment, the scale-free boiler may further include a sensible heat exchanger for heating the water using sensible heat of the heat source, a latent heat exchanger for heating the water using condensed latent heat of exhaust gas generated from the heat source, a condensed water collecting container for storing condensed water generated in the latent heat exchanger, and a drain flow path for draining water flowed into the filter together with the ionic material desorbed from the electrode of the filter in the regeneration mode, wherein at least a portion of the water drained through the drain flow path may be supplied to the condensed water collecting container.

According to an exemplary embodiment, the scale-free boiler may further include a first flow path for communicating the main flow path and an inlet of the filter with each other, a second flow path for communicating the main flow path and an outlet of the filter with each other, and a supplementary flow path for supplying water supplied from the outside of the boiler case to the filter, wherein water supplied to the filter in the regeneration mode may be water supplied from the main flow path through the first flow path or the second flow path, or water supplied from the outside of the boiler case through the supplementary flow path.

According to an exemplary embodiment, a scale-free water heater includes a case, a main flow path disposed inside the case, wherein water for providing heating or hot water flows along the main flow path, a heat source for heating the water flowing along the main flow path, and a filter for removing, based on an electrical force, an ionic material contained in the water flowing along the main flow path or in water to be supplied to the main flow path to cause occurrence of scale.

According to an exemplary embodiment, an ion removal unit for a water heater includes a filter for removing, based on an electrical force, an ionic material in water flowing along a main flow path and being heated by a heat source for providing the heating or hot water.

According to an exemplary embodiment, the filter may selectively activate one of a removal mode for removing the ionic material in the water through an electrode and a regeneration mode for regenerating the electrode.

According to an exemplary embodiment, a portable ion remover includes a filter for removing, based on an electrical force, an ionic material contained in water supplied to a main flow path in a water heater for providing heating or hot water or to a heating flow path in communication with the main flow path to provide the heating, wherein the filter is disposed independently of the water heater, a case for receiving the filter but being disposed to be portable, a first flow path for supplying water to an inlet of the filter, and a second flow path for communicating an outlet of the filter directly or indirectly with the main flow path or with the heating flow path.

According to an exemplary embodiment, the filter may selectively activate one of a removal mode for removing the ionic material in the water through an electrode and a regeneration mode for regenerating the electrode.

According to an exemplary embodiment, the portable ion remover may further include a third flow path for communicating the first flow path and an outlet of the filter with each other, a three-way valve disposed at a connection point between the first flow path and the third flow path, and a fourth flow path for communicating an inlet of the filter and an outside of the case with each other.

According to an exemplary embodiment, water supplied to the filter through the first flow path may be supplied to the main flow path or the heating flow path through the second flow path after removing the ionic material from the water in the removal mode, and water supplied to the first flow path may be supplied to the filter through the third flow path by the three-way valve and then is discharged out of the case through the fourth flow path in the regeneration mode.

Advantageous Effects

According to the present disclosure, the ionic material in the water (the heating water) may be removed based on the electrical force, so that the occurrence of the scale may be prevented in advance, thereby increasing the durability and the life of the water heater.

Further, according to the present disclosure, the filter may be used semi-permanently without physical replacement of the filter by employing the filter based on the electrical force.

Further, according to the present disclosure, the ionic material in the water (the heating water) may be efficiently removed through efficient control of the filter.

MODE FOR INVENTION

Figure 1:
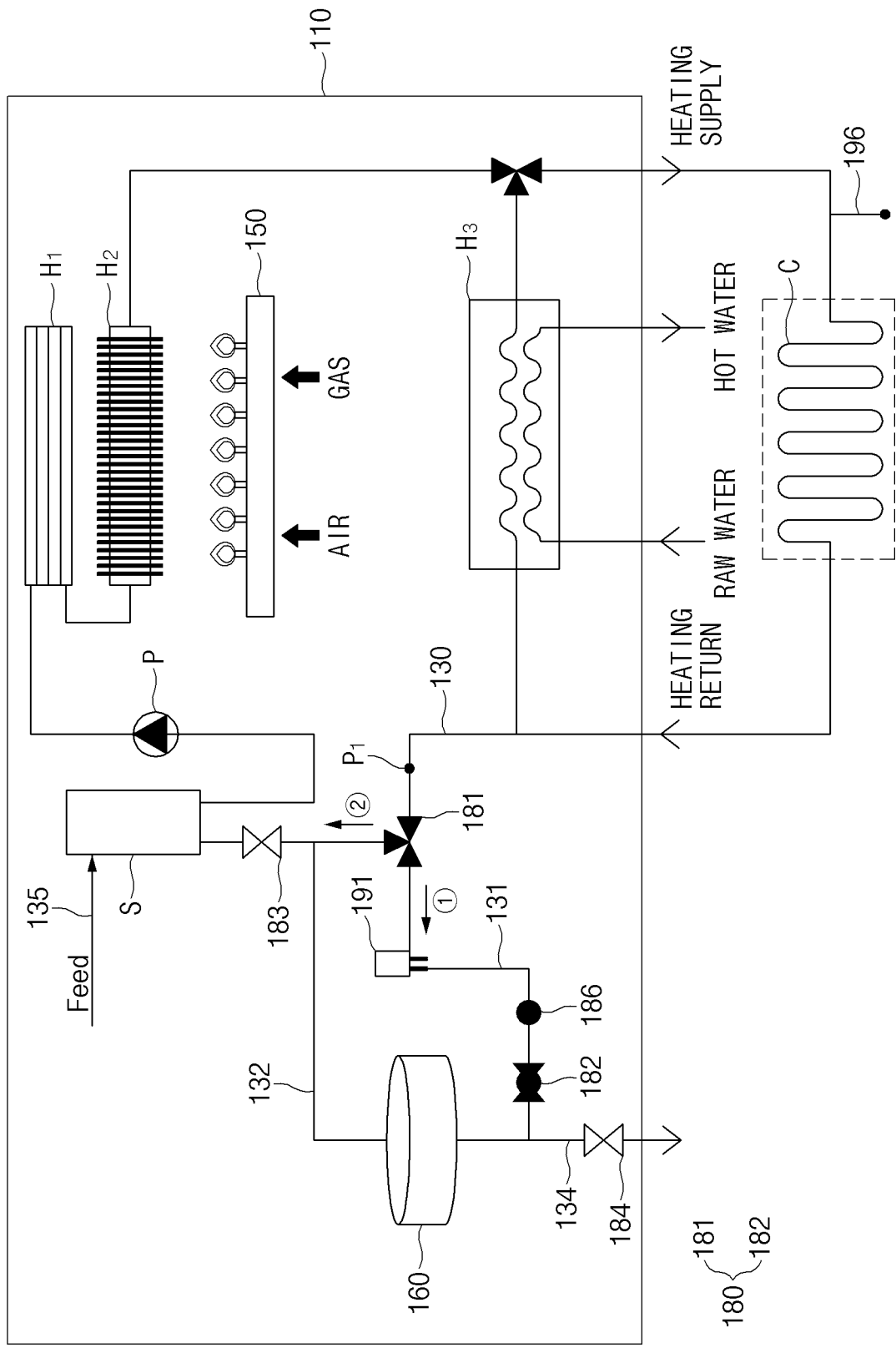
FIG. 1 is a conceptual diagram conceptually illustrating a boiler according to Embodiment 1 of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. It should be noted that if it is described in the specification that one component is "connected," "coupled" or "joined" to another component, a third component may be "connected," "coupled," and "joined" between the first and second components, although the first component may be directly connected, coupled or joined to the second component.

Embodiment 1

FIG. 1 is a conceptual diagram conceptually illustrating a boiler according to Embodiment 1 of the present disclosure. The boiler according to the present embodiment includes a boiler case 110, a main flow path 130, a heat source 150, and a filter 160, as shown in FIG. 1.

Boiler Case 110

The boiler case 110 is for accommodating the main flow path 130, the heat source 150, the filter 160, and other components to be described later therein. The boiler case 110 may generally be formed in a shape of a hollow rectangular parallelepiped, but the shape of the boiler case 110 is not limited thereto. A case of the water heater to be described later is basically the same as the boiler case.

Main Flow Path 130

The main flow path 130 is a flow path formed in the boiler case 110 and for flowing water (heating water) inside the boiler case 110.

The heating water flows along a heating flow path C formed for a heating target to which heating is required, and provides heating to the heating target. After providing the heating, the heating water is returned to the boiler along the main flow path 130 in communication with the heating flow path C. The heating water is heated by the heat source 150 to be described later while flowing along the main flow path 130. The heating flow path C and the main flow path 130 are in communication with each other directly or indirectly.

The main flow path 130 may refer to all flow paths along which the heating water flows inside the boiler case 110. First, the main flow path 130 may be implemented by a pipe formed in the boiler case 110. For example, the main flow path 130 may be implemented by a pipe for connecting an expansion tank S for receiving volume expansion of the heating water and a pump P for forcing the flow of the heating water in the main flow path to each other. Next, the main flow path 130 may be implemented by a flow path formed in the heat exchanger. For example, the main flow path 130 may be implemented by a flow path formed inside a latent heat exchanger $H_1$ and a sensible heat exchanger $H_2$.

For reference, as shown in FIG. 1, the pump P may be disposed on the main flow path 130 at a downstream side when compared with a second flow path 132 to be described later with respect to a flow direction of the heating water. In addition, the pump P may be disposed on the main flow path 130 on an upstream side when compared with a first flow path 131 to be described later with respect to the flow direction of the heating water. In this case, the pump P may be disposed adjacent to the first flow path 131.

For reference, because the main flow path 130 is disposed inside the boiler case 110, the most downstream of the main flow path 130 refers to a position (see 01 of FIG. 12) immediately before the heating water flows out of the boiler case 110, and the most upstream means a position (see $i_1$ of FIG. 12) immediately after the heating water flows into the boiler case 110.

Heat Source 150

The heat source 150 is for heating the heating water flowing along the main flow path 130, and is disposed in the boiler case 110. For example, the heat source 150 may include a heat exchanger and a conventional burner for receiving air and gas, mixing the air and the gas with each other to form a mixture, and burning the mixture.

The heat source 150 may heat the heating water via generated flame, or may heat the heating water via exhaust gas generated during the generation of the flame. A boiler that uses the heat doubly as described above is commonly referred to as a condensing boiler. The condensing boiler may include the sensible heat exchanger $H_2$ for heating the heating water using sensible heat of the heat source 150, and the latent heat exchanger $H_1$ for recovering condensed latent heat of water vapor in the exhaust gas to heat the heating water. However, the heat source of the present specification is not limited to the condensing type including both the sensible heat exchanger and the latent heat exchanger. Any burner or heat exchanger suitable for heating the water for providing the heating or hot water may be applied to the heat source of the present specification.

Filter 160

The filter 160 removes an ionic material in the water (the heating water) based on a scheme of removing the ionic material by an electrical force to prevent occurrence of scale.

To this end, the filter 160 is in communication with the main flow path 130, receives the heating water from the main flow path 130, and removes or reduces the ionic material in the received heating water and then returns the heating water back to the main flow path 130. (Hereinafter, both the removal and the reduction of the ionic material will be referred to as the removal.) For reference, as in an embodiment of FIG. 4 or embodiments of FIGS. 9 and 10, the filter may receive water to be supplied to the main flow path, for example, water to be supplied to the main flow path from outside the boiler case, ahead of the main flow path. In addition, as in an embodiment of FIG. 12, the filter may be disposed outside the boiler case to be in communication directly or indirectly with the main flow path.

When DC voltage is applied to charged particles in electrolyte, positive charged particles move to a negative electrode and negative charged particles move to a positive electrode. This is referred to as electrophoresis. The scheme refers to a scheme of selectively absorbing or moving an ion (the ionic material) in the water through the electrode, an ion exchange membrane, or the like based on a principle of an electrical force (the electrophoresis) as described above.

Usually a calcium ion $Ca^{2+}$ is contained in the water. The calcium ion in water may be precipitated as calcium carbonate $CaCO_3$ by the heat (see an equation below). The precipitated calcium carbonate may be fixed to an inner wall of the pipe or the heat exchanger. The fixation of the calcium carbonate may result in non-uniform transfer of the heat, resulting in local overheating. The local overheating may cause a crack in the pipe or the heat exchanger because of a thermal stress.

$$Ca^{2+}+2HCO_3^-+HEAT \rightarrow CaGO_3+H_2O+CO_2$$

According to the present embodiment, the calcium ion, which is the ionic material in the heating water, may be removed through the filter 160, so that the precipitation/fixation of the calcium carbonate, that is, the occurrence of the scale may be prevented beforehand, resulting in a scale-free boiler.

The filter 160 of the present embodiment may remove the ionic material, so that in addition to the calcium ion, other ionic materials that contribute to the occurrence of the scale, such as a magnesium ion, may be removed.

On the other hand, the heat plays a big part in the occurrence of the scale. Accordingly, the scale occurs mainly in the heat exchanger. In this regard, the filter 160 of the present embodiment may be in communication with the main flow path 130 on the upstream side of the heat exchanger $H_1$ or on the upstream side of the expansion tank S with respect to the flow direction of the heating water.

Flow Path Assembly

The boiler of the present embodiment may further include a flow path assembly.

The flow path assembly is for guiding at least one of the water flowing along the main flow path and the water supplied from the outside of the boiler case to the filter. In addition, the flow path assembly is for guiding the water filtered by the filter to the main flow path. To this end, the filter may include the aforementioned first and second flow paths 131 and 132 or a supplementary flow path 136 to be described later. In addition, the flow path assembly may further include a drain flow path 134 for draining the water flowed into the filter together with the ionic material desorbed from the electrode of the filter in a regeneration mode to be described later.

Filter 160 in a CDI Scheme

The filter 160 of the present embodiment may remove the ionic material in the capacitive deionization (CDI) scheme.

The schemes of removing the ionic material by the electrical force include schemes such as an electrodialysis (ED), an electro deionization (EDI), a continuous electro deionization (CEDI), the capacitive deionization (CDI), and the like. A filter of the ED scheme includes an electrode and an ion exchange membrane. In addition, a filter of the EDI scheme includes an electrode, an ion exchange membrane, and an ion exchange resin. In contrast, the filter of the CDI scheme does not include both an ion exchange membrane and an ion exchange resin, or does not include the ion exchange resin.

Figure 2:
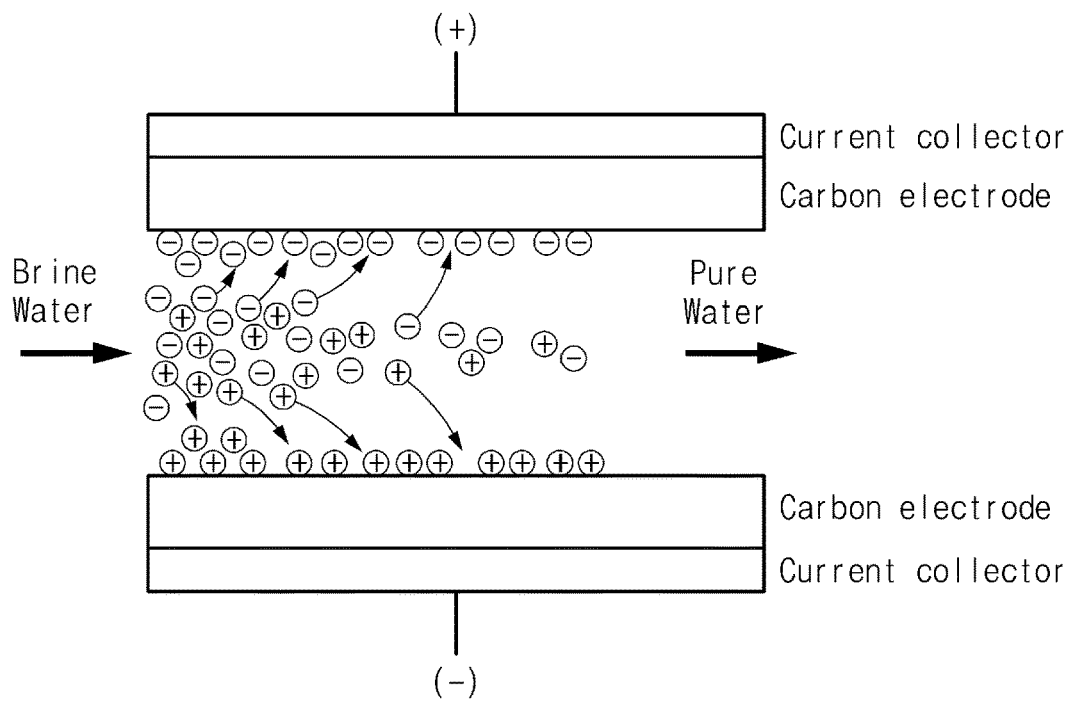
FIG. 2 is a conceptual diagram illustrating a principle of removing ions in a CDI scheme.
Figure 3:
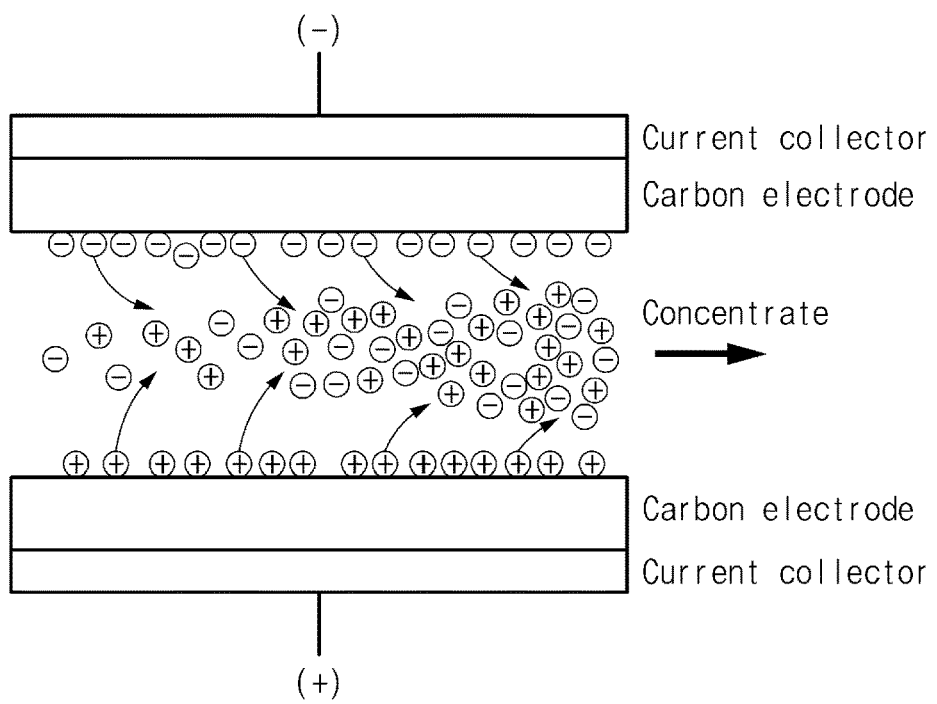
FIG. 3 is a conceptual diagram illustrating a principle in which an electrode is regenerated in a CDI scheme.

The filter of the CDI scheme will be described in more detail. The CDI scheme is a scheme of removing the ion using a principle in which the ion (or the ionic material) is adsorbed on and desorbed from a surface of the electrode by an electric force. This will be described in detail with reference to FIGS. 2 and 3. FIG. 2 is a conceptual diagram illustrating a principle of removing ions in a CDI scheme, and FIG. 3 is a conceptual diagram illustrating a principle in which an electrode is regenerated in a CDI scheme.

When raw water containing ions passes between the electrodes in a state in which a voltage is applied to the electrodes, anions move to the positive electrode and cations move to the negative electrode as shown in FIG. 2. That is, adsorption occurs. Such adsorption may remove the ions in the raw water. Thus, a mode of removing the ion (the ionic material) will be referred to below as a removal mode.

However, an adsorption capacity of the electrode is limited. Therefore, when the adsorption is continued, the electrode is brought to a state of being no longer able to adsorb the ions. To prevent this, as shown in FIG. 3, it is necessary to desorb the ions adsorbed to the electrode to regenerate the electrode. To this end, a voltage opposite to the voltage applied in the removal mode may be applied or no voltage may be applied to the electrode. A mode of regenerating the electrode as described above will be referred to as the regeneration mode below. The regeneration mode may be performed before or after the removal mode, and a time interval between the regeneration mode and the removal mode may be set variously. The regeneration mode as described above enables semi-permanent use of the filter of the present embodiment.

Control of the filter 160 may be responsible for a controller to be described later.

Finally, the filter 160 of the CDI scheme selectively performs one of the removal mode and the regeneration mode as needed, performs the removal mode to remove the ionic material in the heating water, and performs the regeneration mode to regenerate the electrode before or after the removal mode. The filter 160 may maintain a standby state without performing any mode. In the standby state, no voltage is applied to the electrode.

In one example, the filter 160 of the CDI scheme may select a type of the ionic material to be removed by adjusting a magnitude of the voltage applied to the electrode. For example, in a case of a monovalent ion, a removal rate by the filter 160 also increases as the magnitude of the voltage applied to the electrode increases. In contrast, in a case of a divalent ion, even when the magnitude of the voltage increases, the removal rate does not change significantly. Accordingly, when a low voltage (e.g., a voltage of about 20 to 50% of an operating condition for 100% removal) is applied to the electrode, the filter 160 mainly removes the divalent ions. Usually, the divalent ions, such as the calcium ion, the magnesium ion, and the like, cause the scale problem in the boiler. Therefore, when the voltage applied to the electrode of the filter 160 is adjusted to the low voltage, the divalent ions may be mainly removed.

The above scheme is very energy efficient. Because the low voltage is applied to the electrode, although energy consumption is small, the divalent ions mainly causing the scale problem may be removed.

Communication of the Filter 160 of the CDI Scheme with the Main Flow Path 130 (Removal Mode)

The filter 160 may be in communication with the main flow path 130 via the first flow path 131 and the second flow path 132. In other words, the boiler of the present embodiment may further include the first flow path 131 communicating the main flow path 130 and an inlet of the filter 160, and the second flow path 132 communicating the main flow path 130 with an outlet of the filter 160. The second flow path 132 is in communication with the main flow path 130 on the downstream side when compared with the first flow path 131 with respect to the flow direction of the heating water flowing along the main flow path 130.

The filter 160 in the removal mode receives the heating water from the main flow path 130 through the first flow path 131. Further, the filter 160 discharges the heating water to the main flow path 130 through the second flow path 132, after the removal of the ionic material. Thus, the heating water may return to the main flow path 130 after the removal of the ionic material.

The boiler of the present embodiment may further include a first valve assembly 180 to supply the heating water in the main flow path 130 to the filter 160. The first valve assembly 180 bypasses at least a portion of the heating water flowing along the main flow path 130 to the first flow path 131.

To this end, the first valve assembly 180 may include a three-way valve 181 disposed at a connection point of the main flow path 130 and the first flow path 131. The three-way valve 181 may bypass a portion or an entirety of the heating water in the main flow path 130 to the first flow path 131. The three-way valve 181 may adjust a flow rate of the heating water bypassed to the first flow path 131.

Alternatively, the first valve assembly 180 may further include an adjustment valve 182 for adjusting the bypass flow rate. For example, the first valve assembly 180 may bypass the entirety of the heating water in the main flow path 130 through the three-way valve 181 to the first flow path 131, and then, adjust a flow rate of the heating water to be flowed into the filter 160 through the adjustment valve 182. The adjustment valve 182 may be a control valve for adjusting the flow rate. For reference, the flow rate of the heating water flowing along the first flow path 131 may be obtained through a flow rate sensor 186.

In addition, the boiler of the present embodiment may further include a second valve assembly 183. The second valve assembly 183 is disposed on the main flow path 130 on a downstream side when compared with the connection point of the main flow path 130 and the second flow path 132. The second valve assembly 183, which is an opening and closing valve for controlling opening and closing of the main flow path 130, may be a solenoid valve.

Connection of the Filter 160 of the CDI Scheme with the Main Flow Path 130 (Regeneration Mode)

The filter 160 may be in communication with the outside of the boiler case 110 through the drain flow path 134. That is, the boiler of the present embodiment may further include the drain flow path 134 for communicating the inlet of the filter 160 to the outside of the boiler case 110. In addition, the boiler of the present embodiment may further include a drain valve 184 disposed on the drain flow path 134 to control opening and closing of the drain flow path 134. The drain valve 184 may be a solenoid valve.

The filter 160 in the regeneration mode receives the heating water from the main flow path 130 through the second flow path 132. The ionic material desorbed from the electrode of the filter 160 is discharged from the filter 160 through the drain flow path 134 together with the heating water. To this end, the boiler of the present embodiment closes the second valve assembly 183 in the regeneration mode and opens the drain valve 184. In addition, the aforementioned three-way valve 181 guides the entirety of the heating water in the main flow path 130 toward the connection point of the main flow path 130 and the second flow path 132 (see a ② direction of FIG. 1).

In the present embodiment, flow directions of the heating water in the removal mode and the regeneration mode are opposite to each other with respect to the filter 160. A relatively large amount of the ionic material in the heating water is adsorbed at the inlet side of the filter 160 in the removal mode. Therefore, when the heating water flows in the opposite direction in the regeneration mode, it is effective to remove the adsorbed ionic material at the inlet side.

In addition, when the flow directions of the heating water in the removal mode and the regeneration mode are opposite to each other, the desorbed ionic material in the heating water may be prevented from flowing into the main flow path 130. After end of the regeneration mode, the heating water remains in the first flow path 131 between the filter 160 and the three-way valve 181. The desorbed ionic material may be contained in the remaining heating water. However, when a next removal mode is performed, the heating water described above will pass again through the filter 160. The ionic material may be removed during such process.

In one example, in the regeneration mode, the heating water in the main flow path passes through the filter 160 and is drained through the drain flow path 134. Therefore, because the heating water in the main flow path, or heating water in the expansion tank S may be reduced, the heating water may be additionally supplied through a supply flow path 135 to compensate for such reduction. In a case of boilers, generally the supply flow path 135 may be connected to the expansion tank S to keep a water level of the expansion tank S constant. Another embodiment herein may also utilize the supply flow path 135 for supplement of the heating water. The supply flow path 135 may be a flow path for receiving the raw water separately from the outside of the boiler case 110, or may be a flow path in communication with a line for supplying the raw water (direct water) to a heat exchanger $H_3$ to be described later for generation of hot water. The supply flow path may also be connected to the expansion tank as shown in the drawing, or may be connected to the main flow path.

Basic Control of the Filter 160 in the CDI Scheme

The boiler of the present embodiment may further include the controller (not shown) for controlling the above-described valves, and the controller may control the valves in the removal mode and the regeneration mode as follows. For reference, a ① direction below indicates a left direction with respect to the three-way valve 181 in FIG. 1, and the direction ② below indicates an upward direction with respect to the three-way valve 181.

TABLE 1

| Division | Valve 181 | Valve 183 | Valve 184 | Pump P |
|---|---|---|---|---|
| Removal mode | Opened in the direction ① | Opened | Closed | Operative |
| Regeneration mode 1 | Opened in the direction ② | Closed | Opened | Operative |
| Regeneration mode 2 | Opened in the direction ② | Opened | Opened | Inoperative |

Based on Table 1, in the removal mode, the heating water is flowed into the filter 160 through the first flow path 131 from the main flow path 130, and then is returned to the main flow path 130 through the second flow path 132 after the removal of the ionic material. In addition, in the regeneration mode 1, the heating water is flowed into the filter 160 through the second flow path 132 from the main flow path 130, and then drained through the drain flow path 134 together with the desorbed ionic material. In this connection, the heating water flows by the pump P.

The regeneration mode 2 is a mode in which the regeneration is performed by flow of the heating water dropped by gravity from the expansion tank S when the pump P is inoperative. When the operation of the pump P is stopped and the valve 183 and the valve 184 are opened, the flow for performing the regeneration mode may occur by the heating water dropped by the gravity from the expansion tank S. That is, the heating water dropped by the gravity from the expansion tank S may be flowed into the filter 160 through the second flow path 132. Such control may also be applied to embodiments to be described later.

However, the valve 184 may repeat the opening and the closing during the regeneration mode. Stagnation of the heating water is more favorable for the desorption of the ionic material adsorbed to the electrode. The valve 184 may close the drain flow path 134 during the regeneration mode to temporarily form the stagnant state of the heating water. Such control may reduce a flow rate of the heating water to be drained and left out. Such control may also be applied to embodiments to be described later.

For reference, in a case of the regeneration through the repetition of the opening and the closing as described above, it may be more effective that the pump P is disposed on the main flow path 130 to be adjacent to the first flow path 131 on an upstream side when compared with the first flow path 131 with respect to the flow direction of the heating water. This is also the same in embodiments to be described later.

For reference, the controller includes a processor and a memory, and the memory stores data and control instructions. The processor may be programmed to receive the control instructions stored in the memory and to transmit the control instructions to a driver (a component performing a particular operation, such as the pump). The memory may be a data store, such as a hard disk drive, a solid state drive, a server, a volatile medium, a nonvolatile medium, and the like.

Specific Control of the Filter 160 of the CDI Scheme (Removal Mode)

The controller of the present embodiment may control the first valve assembly 180 such that the bypassing of the heating water is continued except in the regeneration mode until the amount of the ionic material contained in the heating water flowing along the first flow path 131 or along the main flow path 130 before flowing into the first flow path 131 (e.g., a point $P_1$ in FIG. 1) is reduced to a preset target amount. For example, the target amount may be determined based on a TDS to be described later, and specifically, may be equal to or less than 150 PPM.

As the heating water is bypassed in the main flow path 130 and is supplied to the filter 160 in the removal mode, the amount of the ionic material in the heating water flowing along the main flow path 130 will gradually decrease. In this connection, because the heating water is not flowed into the filter 160 yet, the heating water flowing along the first flow path 131 or the heating water flowing along the main flow path 130 before being flowed into the first flow path 131 may contain the highest amount of the ionic material. Accordingly, when the controller controls the first valve assembly 180 as described above, the entirety of the heating water flowing along the main flow path 130 may contain substantially less than the target amount of the ionic material.

However, when it is necessary to regenerate the electrode during the bypass as described above, the controller stops the control as described above and performs control to be described later required in the regeneration mode. When the regeneration mode is ended, the controller continues the control as described above again.

In one example, in a case of the boiler, because the existing heating water continues to circulate until heating water is re-supplied, the filtering as described above may prevent the occurrence of the scale semi-permanently until the re-supply of the heating water. However, the scale that has already occurred is difficult to be removed. Accordingly, the control as described above is preferably performed whenever the heating water is initially supplied to the main flow path 130 or additionally supplied after the initial supply. Further, because the precipitation/fixation of the calcium carbonate mainly occurs initially when the heating water is newly supplied, it is preferable that the control as described above is performed during the new supply of the heating water or immediately after the supply.

For reference, the flow rate of the heating water bypassed from the main flow path 130 to the filter 160 in the removal mode may be determined based on a capacity of the filter 160. For example, when the capacity of the filter 160 is large enough, the entirety of the heating water in the main flow path 130 may be bypassed to the filter 160. However, when the capacity of the filter 160 is not large, in consideration of the capacity of the filter 160, only a portion of the heating water in the main flow path 130 may be bypassed to the filter 160. However, in the latter case, it takes more time to reach the target amount of the ionic material in the heating water.

In one example, a bypass flow rate that is the flow rate of the heating water bypassed to the first flow path 131 from the main flow path 130 may be adjusted as follows.

Firstly, the bypass flow rate may be adjusted based on a removal rate defined by a following equation. $A_{in}$ below is the amount of the ionic material in the heating water flowing along the first flow path 131, and $A_{out}$ is an amount of the ionic material in the heating water flowing along the second flow path 132.

$$\text{Removal rate} = \frac{A_{in} - A_{out}}{A_{in}}$$

A TDS sensor to be described later may be installed on each of the first flow path 131 and the second flow path 132 to obtain the $A_{in}$ and the $A_{out}$. Alternatively, because it is unlikely that the ionic material will be added to the heating water while the heating water is circulating the main flow path 130 and the heating flow path C (unless there is the additional supply of the heating water), and because a time it takes for the heating water to circulate the main flow path 130 and the heating flow path C one time is substantially constant, a TDS sensor 191 installed on the first flow path 131 may firstly obtain a TDS value and obtain the $A_{in}$ based on the TDS value, and then after a lapse of a predetermined time, for example, the time it takes for the heating water to circulate one time, the same TDS sensor 191 may obtain the TDS value again to obtain the $A_{out}$ based on the obtained TDS value.

A removal capacity of the filter 160 is usually fixed. Therefore, as the flow rate of the heating water supplied to the filter 160 increases, the removal rate of the ionic material by the filter 160 decreases after a certain flow rate. As such, the bypass flow rate affects the removal rate. That is, the decrease of the bypass flow rate results in an increase in the removal rate, and the increase in the bypass flow rate results in a decrease in the removal rate.

Adjustment of the removal rate is associated with the capacity of the filter 160. For example, instead of reducing a size of the filter 160 to reduce the capacity of the filter 160, when the flow rate of the heating water bypassed to the filter 160 is reduced, the filter 160 of a small size may sufficiently remove the ionic material in the heating water.

However, because of the decrease in the bypass flow rate, a bypass time of the heating water may be slightly increased. Because the same heating water continues to circulate along the flow path in the boiler, that is, there is no additional inflow of the ionic material, the increase in time does not significantly affect the prevention of the occurrence of the scale in the present embodiment.

Alternatively, the adjustment of the removal rate is associated with a water quality of the raw water. For example, when first supplied raw water or additionally supplied raw water contains a large amount of the ionic material, the controller may reduce the bypass flow rate through control of the first valve assembly 180.

In one example, the adjustment of the bypass flow rate may be performed through the control of the first valve assembly 180 by the controller. This is the same also in a case of adjusting the bypass flow rate below.

Secondly, the bypass flow rate may be adjusted based on a residual amount of the ionic material in the heating water discharged from the filter 160 and flowing along the second flow path 132. The TDS sensor may be installed on the second flow path 132 to obtain the residual amount. Alternatively, the TDS sensor 191 installed on the first flow path 131 may firstly obtain the TDS value, and then after the predetermined time elapses, the same TDS sensor 191 may obtain the TDS value again to obtain the residual amount based on the TDS value obtained again.

The removal capacity of the filter 160 is usually fixed. Therefore, as the flow rate of the heating water supplied to the filter 160 increases, the residual amount, that is, an amount of the ionic material not removed increases. As such, the bypass flow rate affects the residual amount. In other words, the increase in the bypass flow rate leads to an increase in the residual amount. In addition, the decrease in the bypass flow rate leads to a reduction in the residual amount.

An adjustment of the residual amount may also be associated with the capacity of the filter 160 or the water quality of the raw water, in the same manner as the adjustment of the removal rate.

Sensing Device 191

The boiler of the present embodiment may further include a sensing device for sensing the TDS (total dissolved solid) of the heating water, for example, the TDS sensor 191, to obtain the amount of the ionic material in the heating water. An amount of a soluble material in solution affects an electrical conductivity of the solution. The TDS sensor 191 is a device for estimating a TDS of the solution by measuring the electrical conductivity of the solution.

It is not easy to directly obtain the amount of the ionic material in the heating water. However, the TDS of the solution and the amount of the ionic material in the solution is correlated. Thus, the boiler of the present embodiment may adopt a scheme of estimating the amount of the ionic material in the heating water based on the TDS of the heating water obtained through the TDS sensor 191.

Figure 5:
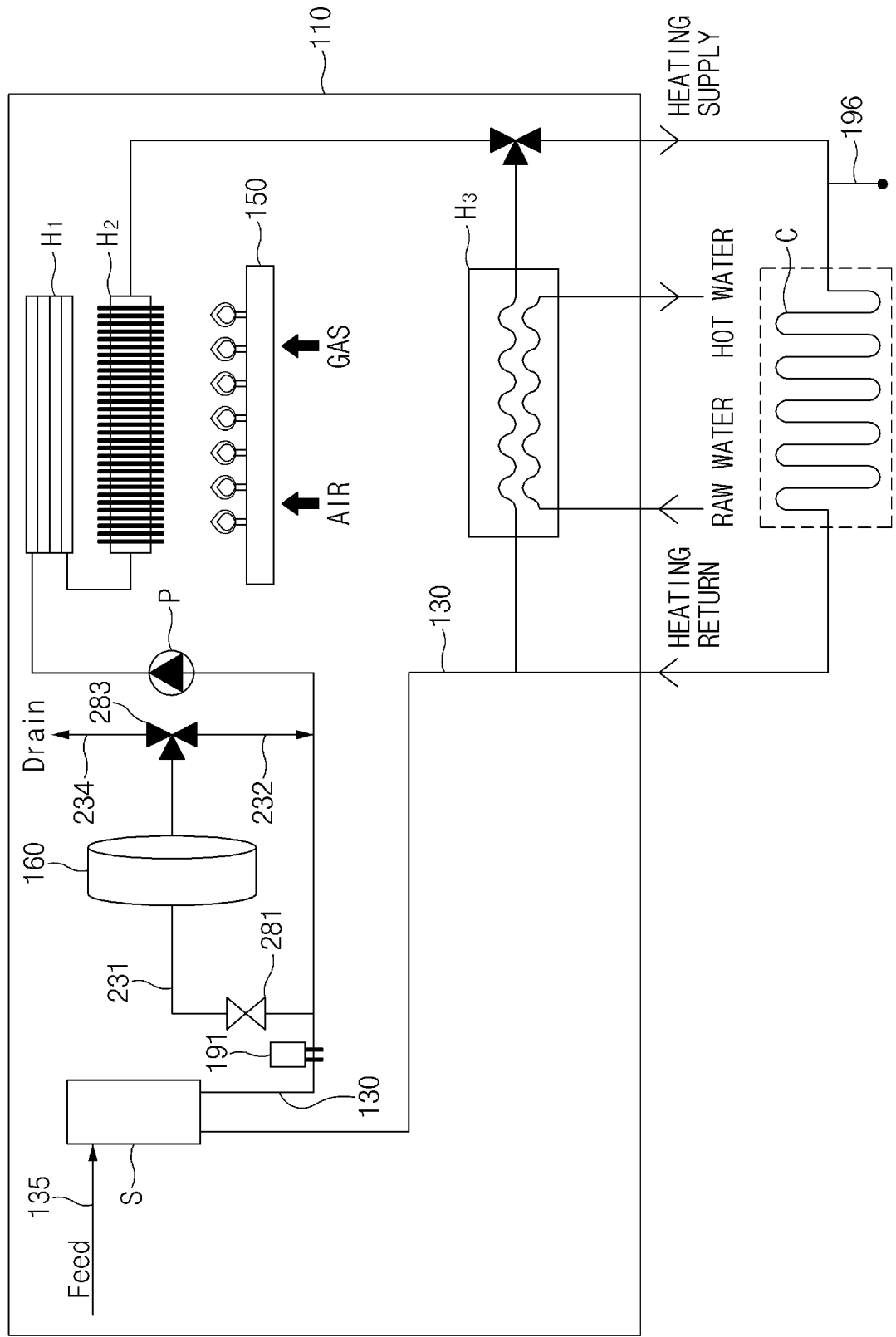
FIG. 5 is a conceptual diagram conceptually illustrating a boiler according to Embodiment 3 of the present disclosure.

The sensing device 191 may be disposed on the first flow path 131 to sense the TDS of the heating water flowing along the first flow path 131. In addition, the sensing device or the TDS sensor may be disposed on the main flow path 130, for example, at the point $P_1$. As also shown in FIG. 5 to be described later, the sensing device may be disposed on the main flow path on an upstream side when compared with the connection point between the first flow path and the main flow path. In the present specification, the amount of the ionic material may be obtained based on the TDS as described above.

For reference, a measured value measured by the TDS sensor may be stored. Thus, the water quality of the raw water firstly supplied or the raw water additionally supplied may be continuously monitored.

Method for Preventing the Occurrence of the Scale

The foregoing may be implemented as the method for preventing the occurrence of the scale as follows.

The method for preventing the occurrence of the scale is a method for preventing the occurrence of the scale in the boiler including the boiler case 110, the main flow path 130, and the heat source 150 for heating the water flowing along the main flow path 130.

More specifically, the above prevention method includes a removing step and an ending step. The removal step is a step of removing the ionic material that is contained in the water flowing along the main flow path 130 or the water to be supplied to the main flow path 130 based on the electrical force, causing the occurrence of the scale. Further, the ending step is a step of ending the removal step.

For example, the removal step may be a step of applying a voltage to the electrode of the filter for removing the ionic material, and the ending step may be a step of stopping the application of the voltage to the electrode. Alternatively, the removal step may be a step of bypassing the water in the main flow path 130 to the filter for the removal of the ionic material, and the ending step may be a step of stopping the bypass as described above.

The above prevention method may further include a regeneration step of regenerating the electrode when the removal step is performed by the filter for removing the ionic material in water through the electrode. The regeneration step may correspond to the regeneration mode described above.

The ending step may be a step of ending the removal step when the amount of the ionic material in the water flowing along the main flow path 130 is reduced to the preset target amount by the removal step. This may correspond to the above description associated with the control of the filter 160.

In one example, even when the removal step is being performed, the removal step may be temporarily stopped when the regeneration of the electrode of the filter is required, and the regeneration step may be performed while the removal step is stopped. When there is a need for continuing the removal step after the end of the regeneration step, for example, when the amount of the ionic material in the water that flows along the main flow path has not been reduced to the preset target amount yet, the removal step may be continued.

The above prevention method may further include a determining step of determining the bypass flow rate which is the flow rate of the water bypassed from the main flow path 130 to the filter 160 through the first flow path 131 during the removal step. The determining step may determine the bypass flow rate based on the removal rate or the residual amount described above.

The above prevention method may be equally applied to the water heater. Further, the removal step may remove the ionic material in the water based on the electrical force.

Embodiment 2

Figure 4:
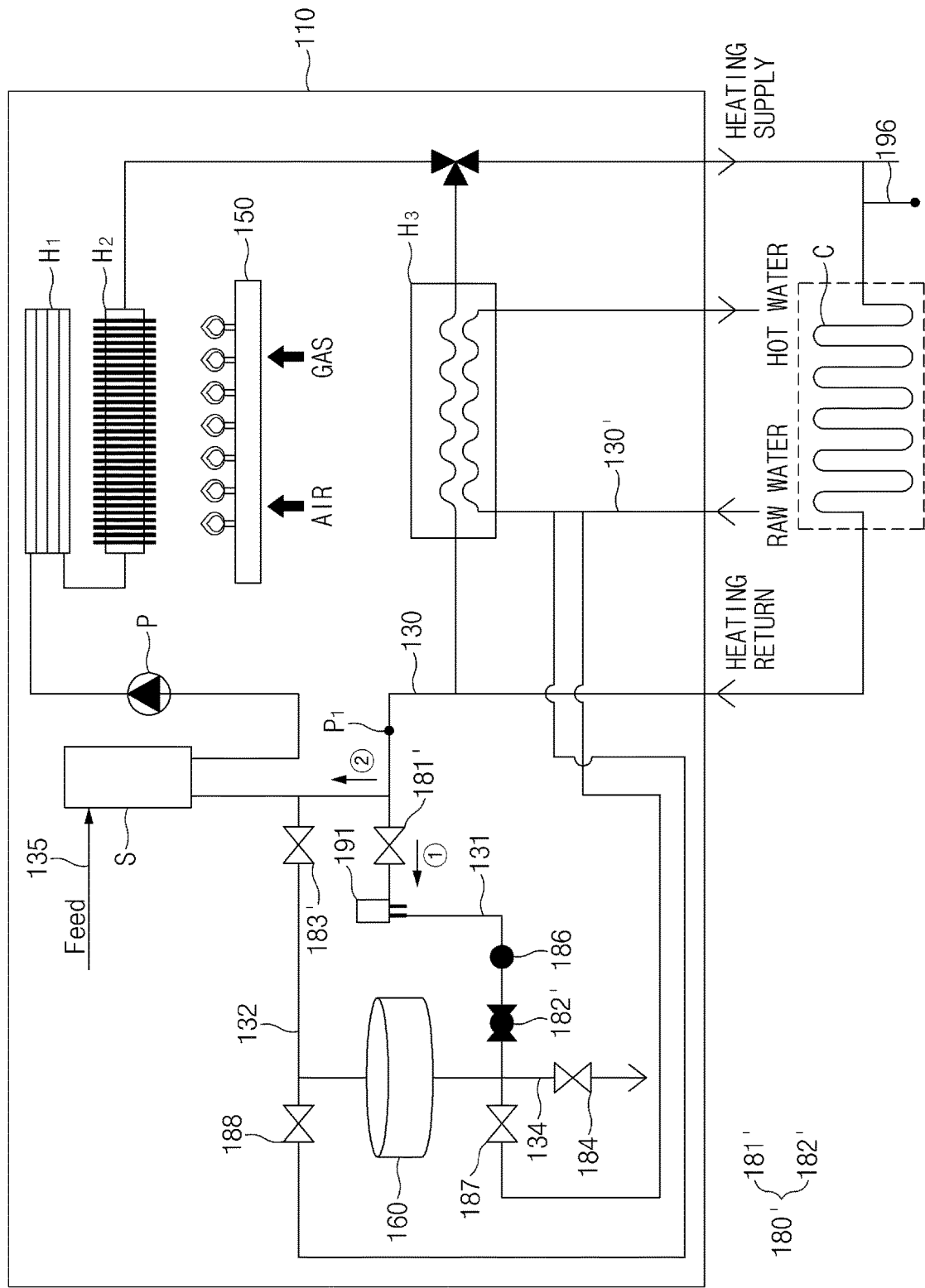
FIG. 4 is a conceptual diagram conceptually illustrating a boiler according to Embodiment 2 of the present disclosure.

FIG. 4 is a conceptual diagram conceptually illustrating a boiler according to Embodiment 2 of the present disclosure. The boiler according to the present embodiment has a basic difference in configurations and controls of the boiler and the filter according to Embodiment 1 described above. For reference, the same or equivalent reference numerals will be assigned to the same or equivalent components as or to the above-described components, and a detailed description thereof will be omitted.

A first valve assembly 180' of the present embodiment includes an opening and closing valve 181' and an adjustment valve 182'. A second valve assembly 183' includes an opening and closing valve. The opening and closing valve may be a solenoid valve.

The opening and closing valve 181' is disposed on the first flow path 131 to control the opening and the closing of the first flow path 131. The adjustment valve 182' is disposed on the first flow path 131 on a downstream side when compared with the opening and closing valve 181' with respect to the flow direction of the heating water flowing along the first flow path 131, and adjusts the flow rate of the heating water flowing along the first flow path 131. The first valve assembly 180' may open the first flow path 131 through the opening and closing valve 181' and adjust the flow rate of the heating water flowing along the first flow path 131 through the adjustment valve 182' to adjust the flow rate of the heating water bypassed to the filter 160 from the main flow path 130.

In one example, the occurrence of the scale is not a problem limited to the boiler. The scale may occur at any time in the water heater that receives the raw water containing the calcium ion and heats the raw water. Accordingly, the filter (an ion removal unit) of the present embodiment is applied to the water heater, such as a boiler for providing the heating, the hot water supplier for supplying the hot water (a direct type hot water supplier without a separate hot water tank or a tank type hot water supplier with the separate hot water tank), a boiler which doubles as a hot water supplier, or the like to remove the ionic material in the water heated by the heat source while flowing along the main flow path in the scheme of removing the ionic material by the electrical force.

For example, in FIG. 4, a flow path along which direct water is supplied and heated may also correspond to a main flow path 130'. Further, the main flow path 130' and the filter 160 may be in communication with each other by two flow paths (a direct water supply flow path and a direct water recovery flow path), so that an ionic material in the direct water may be removed by the filter 160. In a case of the embodiment of FIG. 4, the main flow path 130 for heating the heating water and the main flow path 130' for heating the direct water are in communication with one filter 160.

For reference, the direct water (the raw water) may be heat exchanged with a portion of the heating water and heated in the heat exchanger $H_3$. In the hot water supplier, together with a concentration of the calcium ions in the water and a temperature of use, an amount of the water used affects the fixation of the calcium carbonate. Because of such a feature, in a case of the hot water supplier, as the amount of the water used increases, a probability of the occurrence of the fixation increases.

In one example, other embodiments in the present specification may be applied to the water heater. Further, the above-described content of the filter may be equally applied to the ion removal unit.

However, the boiler of the present embodiment may include the controller (not shown) to control the above-described valves. Details of the control are as follows.

First, the controller may control the valves in the removal mode and the regeneration mode as follows. A valve 187 and a valve 188 below are opening and closing valves respectively arranged on two flow paths communicating a direct water line (see 130') and the filter 160 with each other and respectively controlling opening and closing of the flow paths. The flow of the heating water of the present embodiment becomes substantially the same as the flow of the heating water in Embodiment 1 by following control. There may be a difference in the bypass flow rate.

TABLE 2

| Division | Valve 181' | Valve 183' | Valve 184 | Valve 187 | Valve 188 | Pump P |
|---|---|---|---|---|---|---|
| Removal mode | Opened | Opened | Closed | Closed | Closed | Operative |
| Regeneration mode | Closed | Opened | Opened | Closed | Closed | Operative |

Secondly, the controller may control the valves in the removal mode and the regeneration mode as follows. The following control is useful when supplying the new or additional heating water to the main flow path 130 using the direct water. That is, the direct water supplied through the direct line may be supplied to the main flow path 130 through the filter 160, so that raw water from which the ionic material has been removed may be supplied to the main flow path 130. In this connection, the water may flow by a supply water pressure of the direct water even when the pump is not operated. Further, because the following control uses the direct water during the regeneration mode, that is, because the water in the main flow path 130 is not used during the regeneration mode, after the regeneration mode, there is no need to add water to the main flow path or the expansion tank.

TABLE 3

| Division | Valve 181' | Valve 183' | Valve 184 | Valve 187 | Valve 188 | Pump P |
|---|---|---|---|---|---|---|
| Removal mode | Closed | Opened | Closed | Opened | Closed | Inoperative |
| Regeneration mode | Closed | Closed | Opened | Closed | Opened | Inoperative |

For reference, a valve such as a three-way valve may be further disposed on each of the two flow paths communicating the main flow path 130' and the filter 160 with each other, or at each of connection points between such flow paths and the main flow path 130'. Further, because the two flow paths communicating the main flow path 130' and the filter 160 with each other are flow paths for guiding the water supplied from the outside of the boiler case to the filter 160, such two flow paths may correspond to the supplementary flow path to be described later.

Third, the controller may control the valves in the removal mode and the regeneration mode as follows. The following control is useful when removing the ionic material in the direct water. In a case of the following control, the filtering is not performed for the heating water in the main flow path 130. For reference, a valve such as a three-way valve may be further disposed on each of the two flow paths communicating the main flow path 130' and the filter 160 with each other, or at each of the connection points of such flow paths and the main flow path 130'.

TABLE 4

| Division | Valve 181' | Valve 183' | Valve 184 | Valve 187 | Valve 188 | Pump P |
|---|---|---|---|---|---|---|
| Removal mode | Closed | Closed | Closed | Opened | Opened | Inoperative |
| Regeneration mode | Closed | Closed | Opened | Closed | Opened | Inoperative |

In one example, the valve 187 may be replaced with the three-way valve disposed at each connection point, such as the valve 181 of FIG. 1, and the valve 188 may be replaced with a valve disposed on a downstream side when compared with each connection point, such as the valve 183 of FIG. 1.

Embodiment 3

FIG. 5 is a conceptual diagram conceptually illustrating a boiler according to Embodiment 3 of the present disclosure. The boiler according to the present embodiment has a basic difference in configurations and controls of the boiler and the filter according to Embodiment 1 described above. For reference, the same or equivalent reference numerals will be assigned to the same or equivalent components as or to the above-described components, and a detailed description thereof will be omitted.

The boiler of the present embodiment includes a first flow path 231 communicating the main flow path 130 with the inlet of the filter 160, a second flow path 232 communicating the main flow path 130 and the outlet of the filter 160 on a downstream side when compared with the first flow path 231 with respect to the flow direction of the heating water flowing along the main flow path 130, and a drain flow path 234 in communication with the outlet of the filter 160 to drain the heating water passed through filter 160.

In addition, the boiler of the present embodiment may further include a first valve 281 disposed on the first flow path 231 to control opening and closing of the first flow path 231, and a second valve 283, which is a three-way valve disposed at a branch point of the second flow path 232 and the drain flow path 234. The first valve 281 may be a solenoid valve.

The boiler of the present embodiment may further include the controller (not shown) for controlling the above-described valves, and the controller may control the valves in the removal mode and the regeneration mode as follows.

TABLE 5

| Division | Valve 281 | Valve 283 | Pump P |
|---|---|---|---|
| Removal mode | Opened | Opened toward the main flow path | Operative |
| Regeneration mode | Opened | Opened toward the drain flow path | Operative |

In the above Table, in the removal mode, the heating water is flowed into the filter 160 through the first flow path 231 from the main flow path 130, and then is returned to the main flow path 130 through the second flow path 232 after the ionic material is removed. Further, in the regeneration mode, the heating water is also flowed into the filter 160 through the first flow path 131 from the main flow path 130, and then is drained through the drain flow path 234 together with the desorbed ionic material.

In the present embodiment, the flow direction of the heating water is the same in the removal mode and the regeneration mode. In this case, as shown in FIG. 5, a structure of the flow path connected to the filter 160 may be greatly simplified.

In the regeneration mode of the present embodiment, the flow may be generated by the operation of the pump P, or may be generated by the heating water dropped by the gravity from the expansion tank S while the pump P is not operating. For reference, in a case of the boiler to which a closed expansion tank is applied, the flow may be generated by a pressure (a residual pressure) in the flow path when the valve of the drain flow path side is opened while the pump P is not operating.

In one example, the stagnation of the heating water is more favorable for the desorption of the ionic material adsorbed to the electrode. In the case of the boiler of the present embodiment, 'the opening of the valve 281 and the opening of the valve 283 toward the drain flow path' and 'the closing of the valve 281 and the opening of the valve 283 toward the main flow path' may be repeated alternately to temporarily form the stagnation of the heating water in the filter. During the former control, the heating water of the main flow path 130 will be drained along the drain flow path 234 through the filter 160. When the latter control is performed after the former control is performed, the heating water in the filter 160 may be stagnated without being drained to the main flow path side by the closure of the flow path 231 by the valve 281. This may temporarily form the stagnation of the heating water. In addition, when the operation of the pump P during the latter control is stopped, the stagnation of the heating water may be formed more effectively.

For reference, the boiler of the present embodiment may adjust the flow rate of the heating water supplied to the filter 160 through the control of the pump P by the controller.

Embodiment 4

Figure 6:
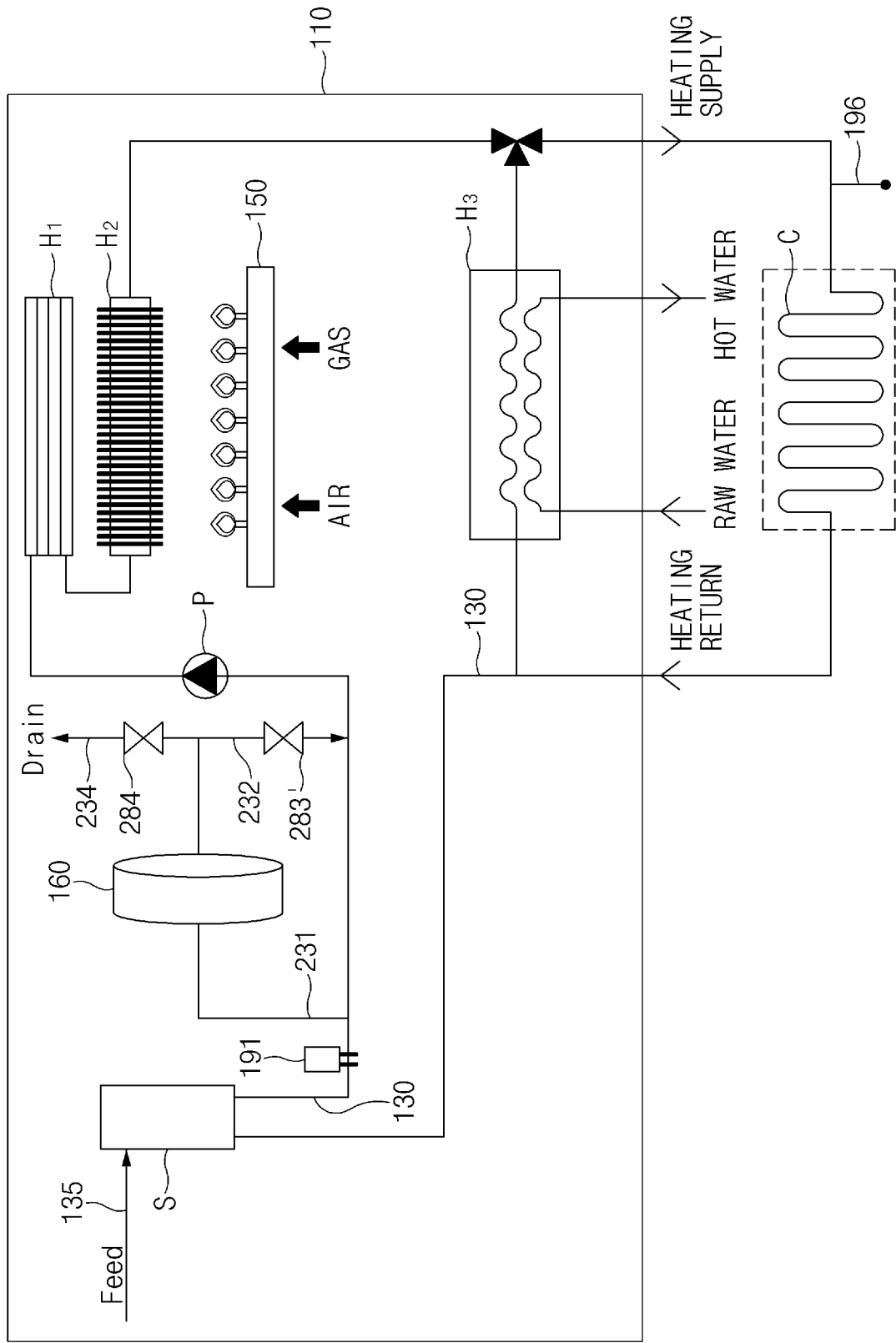
FIG. 6 is a conceptual diagram conceptually illustrating a boiler according to Embodiment 4 of the present disclosure.

FIG. 6 is a conceptual diagram conceptually illustrating a boiler according to Embodiment 4 of the present disclosure. The boiler according to the present embodiment has a basic difference in configurations and controls of the boiler and the filter according to Embodiment 3 described above. For reference, the same or equivalent reference numerals will be assigned to the same or equivalent components as or to the above-described components, and a detailed description thereof will be omitted.

The boiler of the present embodiment includes the first flow path 231 communicating the main flow path 130 with the inlet of the filter 160, the second flow path 232 communicating the main flow path 130 and the outlet of the filter 160 on the downstream side when compared with the first flow path 231 with respect to the flow direction of the heating water flowing along the main flow path 130, and the drain flow path 234 in communication with the outlet of the filter 160 for draining the heating water through the filter 160.

In addition, the boiler of the present embodiment further includes a second valve 283' disposed on the second flow path 232 to adjust the opening and the closing of the second flow path 232, and a drain valve 284 disposed on the drain flow path 234 to adjust the opening and the closing of the drain flow path 234.

The boiler of the present embodiment may further include the controller (not shown) for controlling the above-described valves, and the controller may control the valves in the removal mode and the regeneration mode as follows. The flow of the heating water of the present embodiment becomes substantially the same as the flow of the heating water in Embodiment 3 by following control.

TABLE 6

| Division | Valve 283' | Valve 284 | Pump P |
|---|---|---|---|
| Removal mode | Opened | Closed | Operative |
| Regeneration mode | Closed | Opened | Operative |

In one example, the stagnation of the heating water is more favorable for the desorption of the ionic material adsorbed to the electrode. In the case of the boiler of the present embodiment, 'the closing of the valve 283' and the opening of the valve 284' and 'the closing of the valve 283' and the closing of the valve 284' may be repeated alternately to temporarily form the stagnation of the heating water in the filter. During the former control, the heating water of the main flow path 130 will be drained along the drain flow path 234 through the filter 160. When the latter control is performed after the former control is performed, the heating water in the filter 160 may be stagnant. This may temporarily form the stagnation of the heating water.

Figure 7:
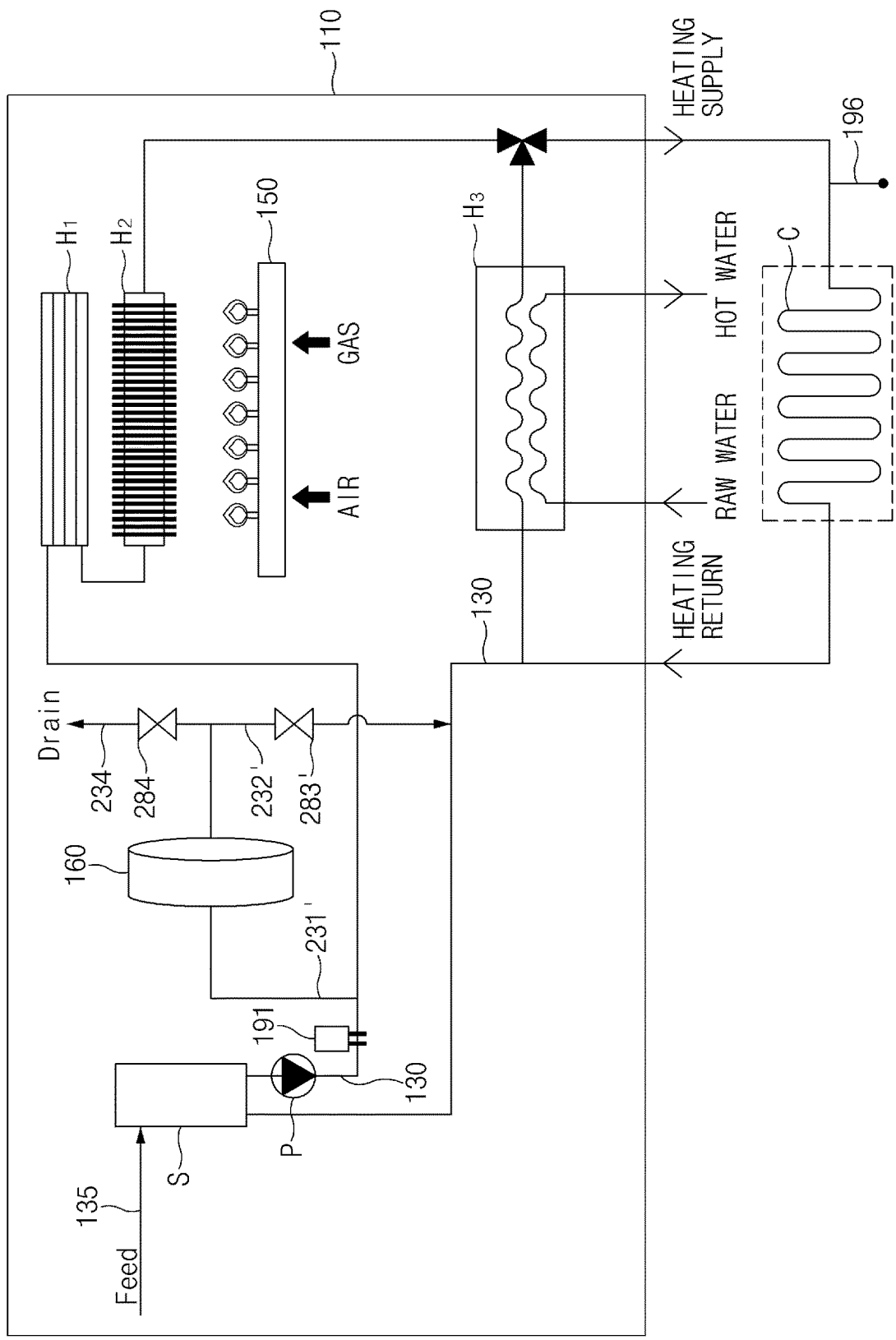
FIG. 7 is a conceptual diagram conceptually illustrating a first variant of a boiler according to Embodiment 4 of the present disclosure.

In one example, the boiler according to Embodiment 4 may be modified as shown in FIG. 7. FIG. 7 is a conceptual diagram conceptually illustrating a first variant of the boiler according to Embodiment 4 of the present disclosure.

The boiler of the present variant includes a first flow path 231' communicating the main flow path 130 and the inlet of the filter 160 with each other, and a second flow path 232' communicating the main flow path 130 and the outlet of the filter 160 with each other. The first flow path 231' is in communication with the main flow path 130 on the downstream side of the pump P, and the second flow path 232' is in communication with the main flow path 130 on the upstream side of the pump P with respect to the flow direction of the heating water flowing along the main flow path 130.

A position with the highest pressure of the fluid in a closed loop along which the fluid circulates may be the outlet of the pump that pumps the fluid, and a position with the lowest pressure of the fluid may be the inlet of the pump. The boiler of the present variant increases a pressure difference between the first flow path 231' and the second flow path 232' based on the pressure relationship as described above, so that the heating water in the main flow path 130 smoothly flows into the filter 160.

Further, in the boiler of the present variant, with respect to the flow direction of the heating water flowing along the main flow path 130, the first flow path may be in communication with the main flow path 130 between the pump P and the heat exchangers $H_1$ and $H_2$ (that is, a position on the downstream side of the pump and at the same time on the upstream of the heat exchanger), and the second flow path may be in communication with the main flow path 130 on the downstream side of the heat exchangers $H_1$ and $H_2$. The above example takes into account that a pressure of the heating water may be reduced while the heating water passes through the heat exchanger.

For reference, it may be preferable that a pressure at a second flow path 232' side is lower than a pressure at a first flow path 231' side to smoothly guide the water in the main flow path 130 to the filter 160. However, even when such a pressure relationship is not satisfied, the water in the main flow path 130 may be gradually bypassed to the filter 160 through the first flow path 231'. Because the water continues to circulate, even when a small amount of the water is supplied to the filter 160 as described above, the ionic material in the water may be lowered to a required amount. This is the same in other embodiments or variants.

Further, FIG. 7 illustrates an example in which the pump P is disposed on the downstream side of the expansion tank S. Accordingly, the first flow path 231' is in communication with the main flow path 130 on the downstream side of the pump P, and the second flow path 232' is in communication with the main flow path 130 on the upstream side of the expansion tank S.

Figure 8:
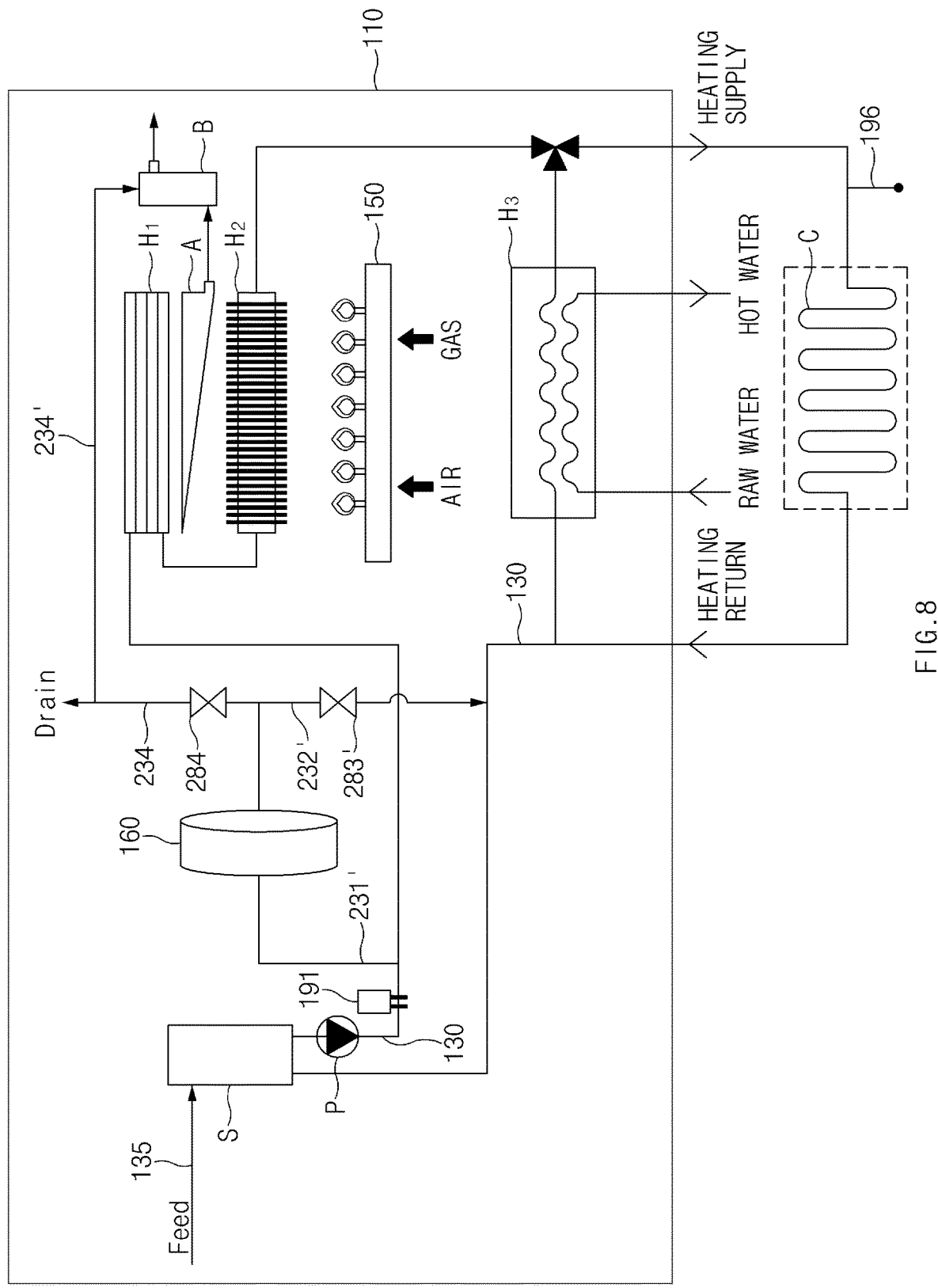
FIG. 8 is a conceptual diagram conceptually illustrating a second variant of a boiler according to Embodiment 4 of the present disclosure.

In addition, the boiler according to Embodiment 4 may be modified as shown in FIG. 8. FIG. 8 is a conceptual diagram conceptually illustrating a second variant of a boiler according to Embodiment 4 of the present disclosure.

The boiler of the present variant may include the latent heat exchanger $H_1$ and the sensible heat exchanger $H_2$. The latent heat exchanger $H_1$ is a heat exchanger using the condensed latent heat generated during condensation of the exhaust gas. Accordingly, condensed water resulted from the condensation of the exhaust gas is generated in the latent heat exchanger $H_1$. A condensed water receiver A in which the condensed water is collected, and a condensed water collecting container B in which the condensed water is temporarily stored may be arranged to remove the condensed water. However, because the condensed water is usually very acidic, it may be necessary to neutralize the condensed water before the condensed water is discharged from the boiler. To this end, the calcium carbonate $CaCO_3$ may be stored in the condensed water collecting container B. Because the calcium carbonate is gradually consumed by the neutralization, periodic supplement of the calcium carbonate is generally required. For reference, the condensed water collecting container B and the expansion tank S may be formed integrally. For example, a portion of a single tank may receive volume expansion of the heating water therein, and another portion of the single tank may receive the condensed water therein.

The boiler of the present variant supplies an entirety or a portion of the heating water drained along the drain flow path 234 in the regeneration mode to the condensed water collecting container B through a branched flow path 234'. The heating water drained in the regeneration mode contains a high concentration of calcium ions or magnesium ions. Therefore, because the heating water as described above may replace a role of the calcium carbonate, the supply of the heating water to the condensed water collecting container B may reduce or eliminate the supply of the calcium carbonate consumed for the neutralization.

For reference, a valve for supplying the heating water as described above may be further included on the branched flow path 234', a connection point between the branched flow path 234' and the drain flow path 234, and the like. When the entirety of the heating water drained is supplied to the condensed water collecting container, the drain flow path 234 and the branched flow path 234' may be formed as a single flow path, so that the drain flow path 234 may be directly connected to the condensed water collecting container B.

The content of the first variant or the second variant may be applied to the above-described embodiment or an embodiment to be described later.

Embodiment 5

Figure 9:
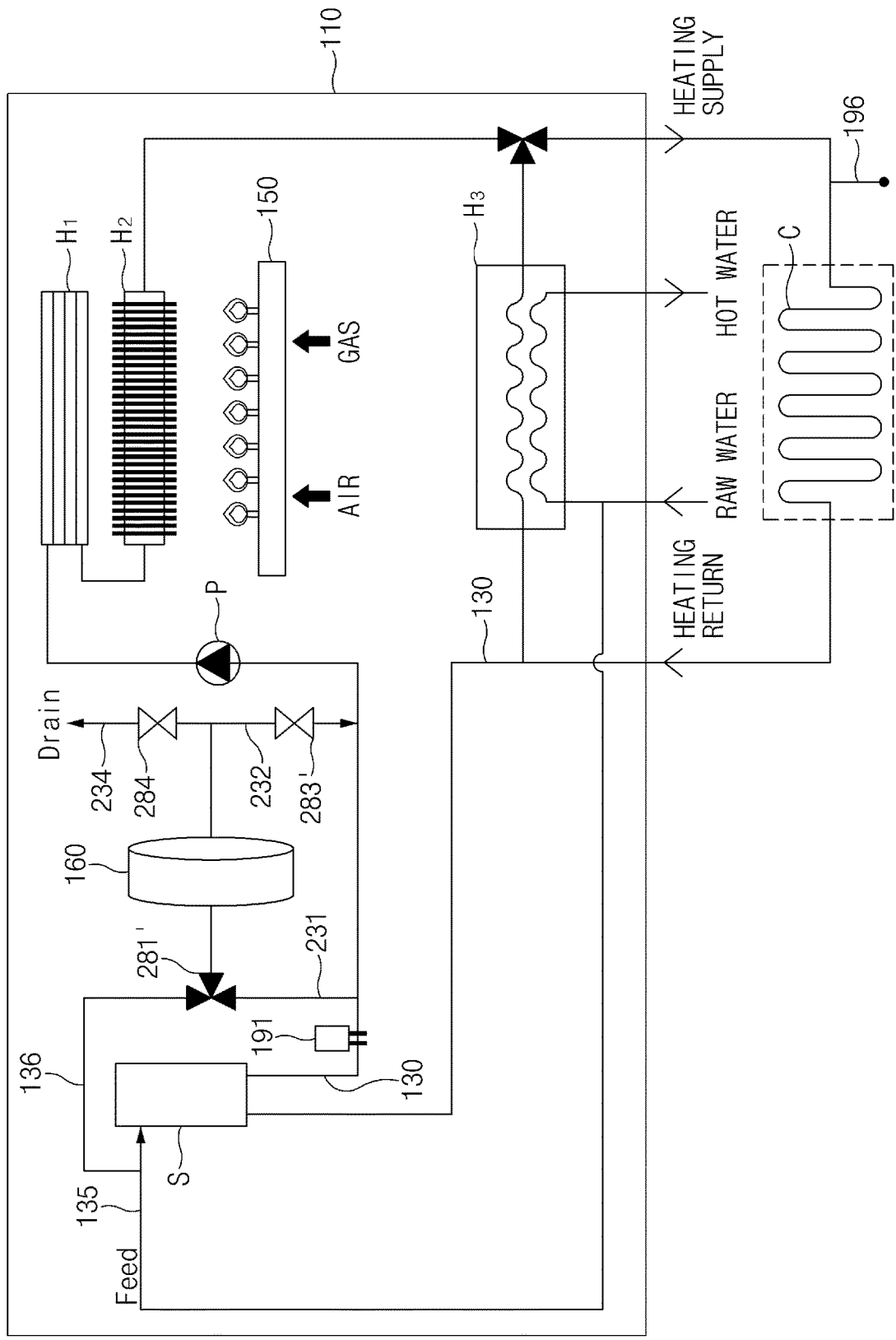
FIG. 9 is a conceptual diagram conceptually illustrating a boiler according to Embodiment 5 of the present disclosure.

FIG. 9 is a conceptual diagram conceptually illustrating a boiler according to Embodiment 5 of the present disclosure. The boiler according to the present embodiment has a basic difference in configurations and controls of the boiler and the filter according to Embodiment 4 described above. For reference, the same or equivalent reference numerals will be assigned to the same or equivalent components as or to the above-described components, and a detailed description thereof will be omitted.

The boiler of the present embodiment includes the supplementary flow path 136 communicating the first flow path 231 and the supply flow path 135 with each other in addition to the first flow path 231, the second flow path 232, and the drain flow path 234. The boiler of the present embodiment further includes a three-way valve 281' disposed at a connection point of the first flow path 231 and the supplementary flow path 136 in addition to the second valve 283' and the drain valve 284. Further, the boiler of the present embodiment may further include a three-way valve (not shown) at a connection point of the supply flow path 135 and the supplementary flow path 136.

The boiler of the present embodiment may further include the controller (not shown) for controlling the aforementioned valves, and the controller may control the valves in the removal mode and the regeneration mode as follows. The boiler of the present embodiment may utilize the heating water in the main flow path 130 or may utilize the raw water (direct water) supplied from the outside of the boiler in the regeneration mode through following control.

TABLE 7

| Division | Valve 281' | Valve 283' | Valve 284 | Pump P |
| --- | --- | --- | --- | --- |
| Removal mode 1 | Opened such that the main flow path 130 and the filter 160 are in communication with each other | Opened | Closed | Operative |
| Regeneration mode 1 | Opened such that the main flow path 130 and the filter 160 are in communication with each other | Closed | Opened | Operative |
| Removal mode 2 | Opened such that the supplementary flow path 136 and the filter 160 are in communication with each other | Opened | Closed | Operative/ Inoperative |

TABLE 7-continued

| Division | Valve 281' | Valve 283' | Valve 284 | Pump P |
| --- | --- | --- | --- | --- |
| Regeneration mode 2 | Opened such that the supplementary flow path 136 and the filter 160 are in communication with each other | Closed | Opened | Operative/ Inoperative |

The flow of the heating water in the removal mode 1 and the regeneration mode 1 of the present embodiment becomes substantially the same as the flow of the heating water in the removal mode and the regeneration mode of Embodiment 4 by the above control.

The removal mode 2 of the present embodiment is a mode for bypassing the raw water (the direct water) in the supply flow path 135, then removing the ionic material from the raw water, and then supplying the raw water from which the ionic material is removed to the main flow path 130. The removal mode 2 may be usefully utilized when additionally supplying the raw water to the main flow path 130.

The regeneration mode 2 of the present embodiment is a mode that bypasses the raw water in the supply flow path 135 and utilizes the bypassed raw water in the regeneration mode. The regeneration mode 2 does not require the supplement of the heating water after completion of the regeneration mode because there is no need to use and drain the heating water in the main flow path 130 for the regeneration mode.

For reference, the removal mode 2 and the regeneration mode 2 may utilize a water pressure of the raw water supplied to the supply flow path 135, so that the removal mode 2 and the regeneration mode 2 may be utilized even when the pump P is not operating. Further, the raw water supplied to the supply flow path 135 may be water (e.g., tap water) supplied from the outside of the boiler for the supply of the hot water. Alternatively, the raw water supplied to the supply flow path 135 may be raw water separately supplied regardless of hot water generation from the outside of the boiler case. In addition, although the supplementary flow path 136 is illustrated as being branched from the supply flow path 135 in FIG. 9, the supplementary flow path may be disposed separately from the supply flow path 135 and directly receive the raw water. The supplementary flow path may receive a portion of the raw water supplied for the hot water generation, or may separately receive the raw water regardless of the hot water generation from the outside of the boiler case.

As described above, the boiler of the present embodiment may guide at least one of the water flowing along the main flow path 130 and the water supplied from the outside of the boiler case to the filter 160 through a flow path assembly 136 and 231.

In particular, the boiler of the present embodiment may selectively guide one of the water flowing along the main flow path 130 and the water supplied from the outside of the boiler case to the filter 160 through the flow path assembly 136 and 231, or through the flow path assembly 136 and 231 and the valve 281' in the removal mode. This may be determined based on a need for the supplement of the water. For example, when there is a need to supplement the water to the main flow path 130 or the expansion tank S, it may be desirable to guide the water supplied from the outside of the boiler case to the filter 160 through the supplementary flow path 136. In this case, because the water filtered by the filter 160 is supplied to the main flow path, the occurrence of the scale may be prevented. When it is not necessary to supplement the water, it will be efficient to supply the water in the main flow path 130 to the filter 160.

In addition, the boiler of the present embodiment may selectively guide one of the water flowing along the main flow path 130 and the water supplied from the outside of the boiler case to the filter 160 through the flow path assembly 136 and 231, or through the flow path assembly 136 and 231 and the valve 281' in the regeneration mode. When using external water (e.g. the direct water) during the regeneration mode, because the water in the main flow path 130 is not used during the regeneration mode, it is not necessary to supplement the water to the main flow path or to the expansion tank after the regeneration mode.

In the boiler of the present embodiment, when the water in the main flow path is supplied to the filter through the first flow path in the removal mode, regarding the control of the filter 160, the content described in the boiler of Embodiment 1 may be applied. For example, until the amount of the ionic material in the water flowing along the first flow path 231 or along the main flow path 130 before being guided to the first flow path is reduced to the preset target amount, the controller may control the valve 281' such that the guide of the water from the main flow path 130 to the filter 160 continues. However, when the water is to be guided to the filter 160 from another flow path (e.g., the supplementary flow path) in the regeneration mode, the above control may be temporarily stopped.

Figure 10:
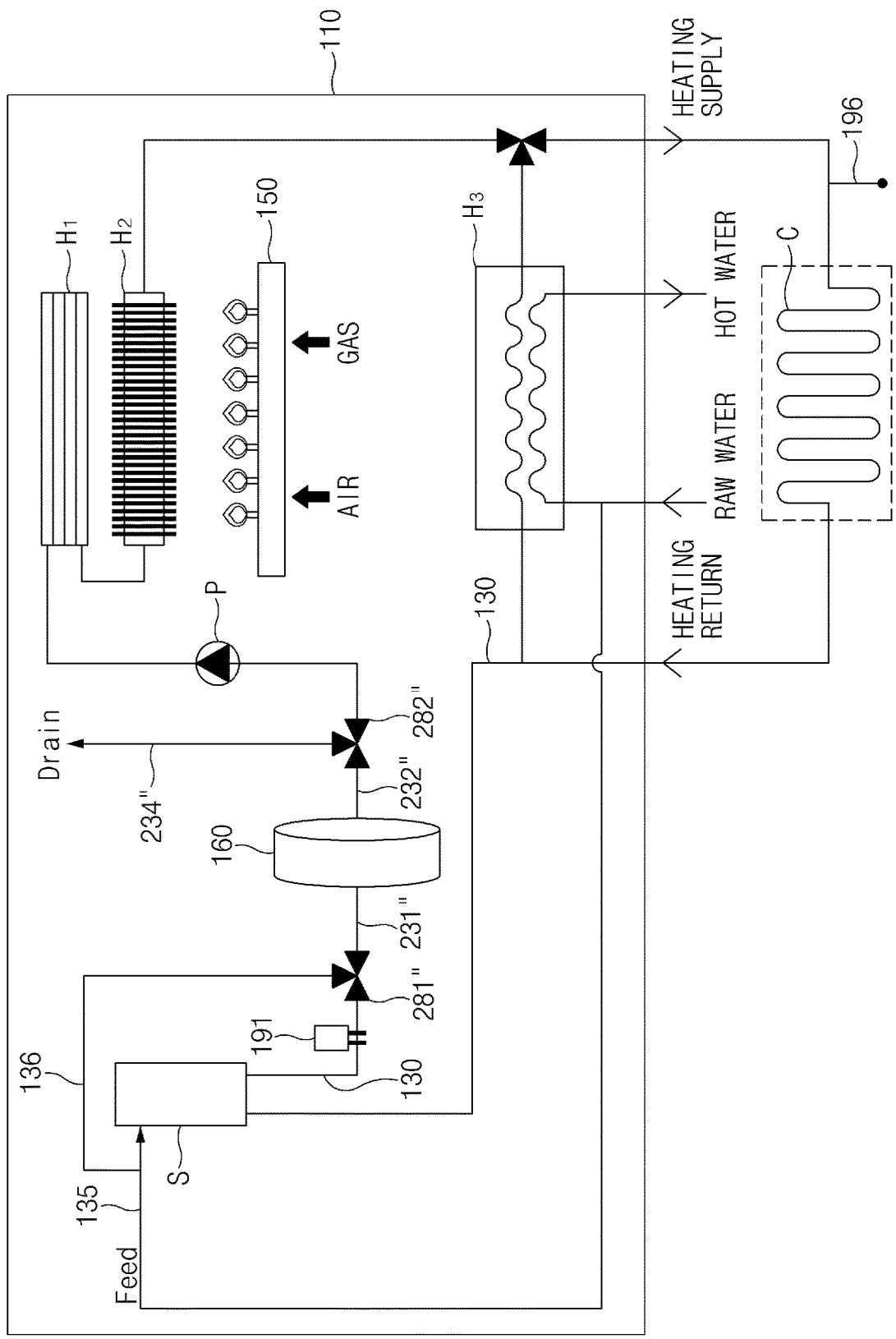
FIG. 10 is a conceptual diagram conceptually illustrating a first variant of a boiler according to Embodiment 5 of the present disclosure.

In one example, the boiler according to Embodiment 5 may be modified as shown in FIG. 10. FIG. 10 is a conceptual diagram conceptually illustrating a first variant of a boiler according to Embodiment 5 of the present disclosure.

The boiler of the present variant includes a first flow path 231" communicating the main flow path 130 and the inlet of the filter 160 with each other, and a second flow path 232" communicating the main flow path 130 and the outlet of the filter 160 with each other. The first flow path 231" and the second flow path 232" are merged into the main flow path 130. That is, a portion of the main flow path 130, for example, a main flow path between a first three-way valve 281" and the filter 160 serves as the first flow path 231". Further, another portion of the main flow path 130, for example, a main flow path between the filter 160 and a second three-way valve 282" serves as the second flow path 232".

Further, the boiler of the present variant includes the first three-way valve 281" disposed at a connection point of the first flow path 231" and the supplementary flow path 136, and a second three-way valve 282" disposed at a connection point of the second flow path 232" and a drain flow path 234". Such valves may be controlled as follows to form the flow of the water in the same manner as the boiler of Embodiment 5.

TABLE 8

| Division | Valve 281" | Valve 282" | Pump P |
|---|---|---|---|
| Removal mode 1 | Opened such that the main flow path 130 at upstream of the valve 281" is in communication with the filter 160 | Opened such that the main flow path 130 at downstream of the valve 282" and the filter 160 are in communication with each other | Operative |

TABLE 8-continued

| Division | Valve 281" | Valve 282" | Pump P |
|---|---|---|---|
| Regeneration mode 1 | Opened such that the main flow path 130 at upstream of the valve 281" is in communication with the filter 160 | Opened to be in communication with a drain side | Operative |
| Removal mode 2 | Opened such that the supplementary flow path 136 and the filter 160 are in communication with each other | Opened such that the main flow path 130 at downstream of the valve 282" and the filter 160 are in communication with each other | Operative/ Inoperative |
| Regeneration mode 2 | Opened such that the supplementary flow path 136 and the filter 160 are in communication with each other | Opened to be in communication with a drain side | Operative/ Inoperative |

Embodiment 6

Figure 11:
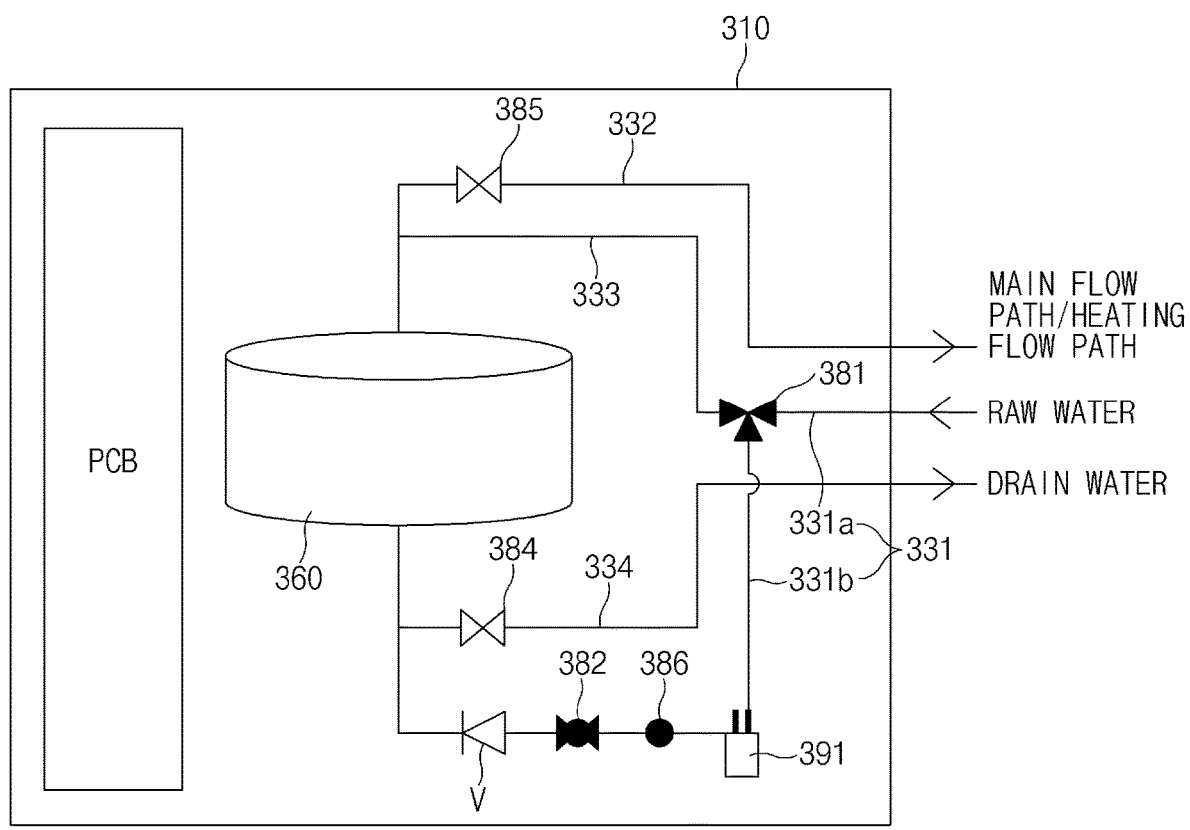
FIG. 11 is a conceptual diagram conceptually illustrating a portable ion remover according to Embodiment 6 of the present disclosure.

FIG. 11 is a conceptual diagram conceptually illustrating a portable ion remover according to Embodiment 6 of the present disclosure. The portable ion remover according to the present embodiment has a basic feature that the portable ion remover is not disposed inside the boiler but is portably disposed independently of the water heater such as the boiler, the hot water supplier, or the like.

The portable ion remover according to the present embodiment includes a filter 360, a case 310, first to fourth flow paths 331 to 334, and a three-way valve 381 as shown in FIG. 11.

The filter 360 removes the ionic material in the water supplied to the main flow path or the heating flow path connected to the main flow path of the water heater for providing the heating or the hot water in the scheme of removing the ionic material by the electrical force, but is disposed independent of the water heater. The filter 360 of the present embodiment is basically the same as the filter 160 of the above-described embodiments except that the filter 360 is disposed independently of the water heater, and the same control may be applied thereto. However, the filter 360 of the present embodiment may include a separate PCB inside the case 310 for independent control.

The case 310, which is for receiving the filter 360 therein, is prepared or implemented to be portable.

The first flow path 331, which is a flow path for supplying water (raw water) to an inlet of the filter 360, is in communication directly or indirectly with a raw water source, such as a faucet. The first flow path 331 includes a portion 331a from a portion in communication with the raw water source to the three-way valve 381 to be described later, and a portion 331b from the three-way valve 381 to the filter 360.

The second flow path 332 is a flow path for directly or indirectly communicating an outlet of the filter 360 and the main flow path or the heating flow path with each other. For example, the main flow path or the heating flow path of the boiler includes an entrance (see 135 or 196 in FIG. 1) for discharging the heating water in the flow path or newly supplying the heating water to the flow path. The second flow path 332 may be in communication with the entrance.

The third flow path 333 is a flow path communicating the first flow path 331 and the outlet of the filter 360. The three-way valve 381 is disposed at a connection point between the first flow path 331 and the third flow path 333.

The raw water is supplied to the inlet of the filter 360 or to the outlet of the filter 360 based on an operation of the three-way valve 381.

The fourth flow path 334, which is a flow path for communicating the inlet of the filter 360 with the outside of the case 310, is a flow path for draining the heating water together with the desorbed ionic material.

The filter 360 may selectively perform one of the removal mode for removing the ionic material in the water through the electrode and the regeneration mode for regenerating the electrode before or after the removal mode in the capacitive deionization scheme.

In the removal mode, the water (the raw water) supplied to the filter 360 through the first flow path 331 is supplied to the main flow path or the heating flow path through the second flow path 332 after the removal of the ionic material. To this end, the three-way valve 381 guides the water supplied from the raw water source to the inlet of the filter 360, a valve 385 on the second flow path 332 opens the second flow path 332, and a valve 384 on the fourth flow path 334 closes the fourth flow path 334.

In the regeneration mode, the water supplied from the raw water source to the first flow path 331 is supplied to the filter 360 along the third flow path 333 by the three-way valve 381, and then is discharged to the outside of the case 310 along the fourth flow path 334. To this end, the three-way valve 381 guides the water supplied from the raw water source to the third flow path 333, the valve 385 on second flow path 332 closes the second flow path 332, and the valve 384 on the fourth flow path 334 opens the fourth flow path 334.

The portable ion remover of the present embodiment may be used in an existing water heater which is not equipped with an apparatus for removing the ionic material in the water used for the heating, the hot water, or the like.

For example, when the raw water (the heating water) is firstly supplied to the boiler or additionally supplied to the boiler after the first supply, and when the first flow path 331 is connected to the raw water source, the second flow path 332 is connected to the above-described entrance and the supply of the raw water by the raw water source is started, the raw water from which the ionic material has been removed by the filter 360 may be supplied to the boiler.

In one example, the portable ion remover according to the present embodiment may further include a controller for controlling the aforementioned valves.

In addition to the control of the valves, the controller may estimate the amount of the ionic material in the raw water through a TDS sensor 391 installed on the first flow path 331, determine a time point for activating the regeneration mode based on the estimated amount of the ionic material, and automatically operate the three-way valve 381 to activate the regeneration mode when it is determined to be the time point for activating the regeneration mode. Alternatively, the controller may automatically activate the regeneration mode when a previously input condition is achieved or the like.

The portable ion remover of the present embodiment may further include a pump (not shown) for pumping the water to the main flow path or to the heating flow path, or may control the pump P on the main flow path using the controller.

For reference, an undescribed reference numeral 382 in FIG. 11 denotes a control valve for adjusting a flow rate of the water supplied to the inlet of the filter, an undescribed reference numeral 386 denotes a sensor for sensing a flow rate of the first flow path 331b, and an undescribed symbol V denotes a check valve for preventing backflow of the water.

Embodiment 7

Figure 12:
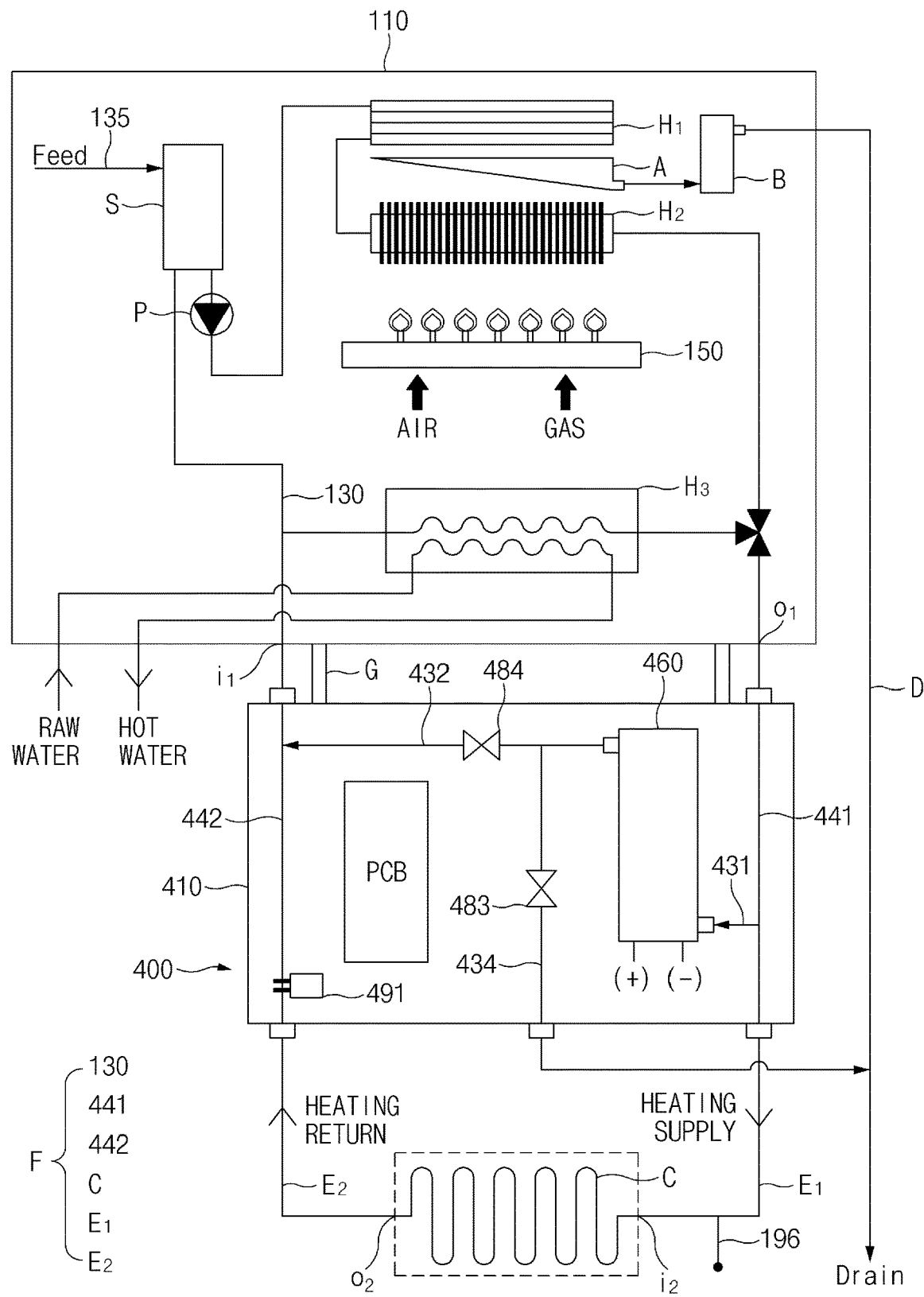
FIG. 12 is a conceptual diagram conceptually illustrating a boiler according to Embodiment 7 of the present disclosure.

FIG. 12 is a conceptual diagram conceptually illustrating a boiler according to Embodiment 7 of the present disclosure. The boiler according to the present embodiment has a basic feature that a filter 460 for removing the ionic material is disposed at the outside of the boiler case 110.

The boiler according to the present embodiment includes the boiler case 110, the main flow path 130, the heat source 150, and a filter module 400, as shown in FIG. 12. Hereinafter, the filter module 400 among such components will be mainly described.

The filter module 400 has the filter 460 therein. The filter 460 of the present embodiment may be the same as the filter of the above-described embodiments or variants. The filter 460 is in communication with a circulation flow path F to receive water from the circulation flow path F, and supplies filtered water to the circulation flow path F. The circulation flow path F, which is a flow path along which the water circulates, includes the main flow path 130 and the heating flow path C, and may further include other flow paths as will be described later.

The filter module 400 is disposed outside the boiler case 110. Accordingly, even without greatly changing the existing boiler, the filter module 400 of the present embodiment may be installed in the existing boiler. This installation gives the existing boiler an ability to prevent the scale from occurring. For example, as shown in FIG. 12, when the filter module 400 is installed in a case of the existing boiler such that a first internal flow path 441, which will be described later, is in communication with an outlet $o_1$ of the main flow path 130 and an inlet $i_2$ of the heating flow path C, and a second internal flow path 442, which will be described later, is in communication with an inlet $i_1$ of the main flow path 130 and an outlet $o_2$ of the heating flow path C, the existing boiler may prevent the scale from occurring in advance. For reference, the above communications include both direct and indirect communications. For example, as shown in FIG. 12, the first internal flow path 441 may be in communication with the inlet $i_2$ of the heating flow path C through a first connection flow path $E_1$, and the second internal flow path 442 may be in communication with the outlet $o_2$ of the heating flow path C through a second connection flow path $E_2$.

The filter module 400 may be implemented to operate independently. For example, the filter module 400 may separately receive power so as to be distinguished from components arranged in the boiler case 110, and may include an independent controller (a filter controller, see a PCB). When the filter module 400 operates independently, it becomes easy to install the filter module 400 in the existing boiler.

The filter module 400 will be described in more detail.

The filter module 400 may include a filter case 410, the first internal flow path 441, and the second internal flow path 442, in addition to the filter 460.

Filter Case 410

The filter case 410 is for receiving the filter 460, the first internal flow path 441, the second internal flow path 442, and other components therein. The filter case 410 may be formed in a shape of a hollow rectangular parallelepiped, but the shape of the filter case 410 is not limited thereto.

The filter case 410 is disposed at the outside the boiler case 110 and is connected to the boiler case 110. A connection bar G may be disposed between the boiler case 110 and the filter case 410 for such a connection. Alternatively, the filter case 410 may not be directly connected to the boiler case 110. For example, the filter case may be implemented such that only required communication of the flow path is implemented through a pipe.

First and Second Internal Flow Path 441 and 442

The first internal flow path 441 and the second internal flow path 442 are arranged inside the filter case 410 to constitute a portion of the circulation flow path F. For example, the water circulates along the main flow path 130, the first internal flow path 441, the heating flow path C, and the second internal flow path 442, as shown in FIG. 12. That is, the circulation flow path F may include the main flow path 130, the heating flow path C, and the first and second internal flow paths 441 and 442 to form a single closed flow path. The circulation flow path F may further include the first and second connection flow paths $E_1$ and $E_2$. The filter 460 is in communication with the circulation flow path F to remove the ionic material from the water in the circulation flow path F. Such communication may be achieved through the first and second internal flow paths 441 and 442. That is, in the present embodiment, the filter 460 receives the water from the first internal flow path 441 side, and discharges the filtered water to the second internal flow path 442.

One end of the first internal flow path 441 is in communication with one of the inlet $i_1$ and the outlet $o_1$ of the main flow path 130, and one end of the second internal flow path 442 is in communication with the other one of the inlet $i_1$ and the outlet $o_1$ of the main flow path 130 to constitute the circulation flow path F as described above. For example, as shown in FIG. 12, one end of the first internal flow path 441 is in communication with the outlet $o_1$ of the main flow path 130, and one end of the second internal flow path 442 may be in communication with the inlet $i_1$ of the main flow path 130.

Further, the other end of the first internal flow path 441 is in communication with one of the inlet $i_2$ and the outlet $o_2$ of the heating flow path C, and the second internal flow path 442 is in communication with the other one of the inlet $i_2$ and the outlet $o_2$ of the heating flow path C. For example, as shown in FIG. 12, the other end of the first internal flow path 441 may be in communication with the inlet $i_2$ of the heating flow path C, and the other end of the second internal flow path 442 may be in communicate with the outlet $o_2$ of the heating flow path C. The above communications may be implemented indirectly through an additional flow path.

In one example, the filter module 400 may include a first bypass flow path 431 for communicating the first internal flow path 441 and an inlet of the filter 460, and a second bypass flow path 432 for communicating the second internal flow path 442 and an outlet of the filter 460. In the removal mode of the filter 460, the water flowing along the circulation flow path F may be guided to the filter 460 from the first internal flow path 441 through the first bypass flow path 431, and may be guided from the filter 460 to the second internal flow path 442 through the second bypass flow path 432 after removal of the ionic material by the filter 460.

The filter module 400 may further include a discharge flow path 434 that communicates the outlet of the filter 460 to the outside of the filter case 410. In the regeneration mode, the water may be guided to the filter 460 from the first internal flow path 441 through the first bypass flow path 431, and may be discharged from the filter module 400 through the discharge flow path 434 together with the ionic material desorbed from the electrode of the filter 460.

In this connection, the discharge flow path 434 may be connected to a condensed water flow path D for the discharge of the water through the condensed water flow path D. The condensed water flow path D is a flow path for discharging the condensed water stored in the condensed water collecting container B. When the boiler is configured as above, the condensed water and reclaimed water (water discharged from the filter in the regeneration mode) may be discharged through a single flow path, so that the overall boiler may be formed simply. Further, the discharge flow path 434 may be connected to the condensed water flow path D in a separable and watertight manner. To this end, connection of the discharge flow path 434 and the condensed water flow path D may be implemented by a check valve type of one-touch fitting. When the boiler is configured as above, the discharge flow path 434 may or may not be connected to the condensed water flow path D as necessary. Further, even when the discharge flow path 434 is separated from the condensed water flow path D, a connection point between the condensed water flow path and the discharge flow path 434 may be maintained watertight.

Valve

The filter module 400 may further include a first filter valve assembly 484 and a controller for controlling the first filter valve assembly 484.

The first filter valve assembly 484 is a valve for bypassing at least a portion of the water flowing along the first internal flow path 441 to the first bypass flow path 431. That is, the first filter valve assembly 484 is a valve for guiding the water in the first internal flow path 441 to the filter 460 under the control of the controller in the removal mode or the regeneration mode of the filter 460.

In the present embodiment, the first filter valve assembly 484 includes the opening and closing valve 484 disposed on the second bypass flow path 432. The water in the first internal flow path 441 may or may not be guided to the filter 460 through the first bypass flow path 431 based on opening and closing of the second bypass flow path 432 by the opening and closing valve 484. The first filter valve assembly may include a three-way valve (not shown) disposed at a connection point of the first internal flow path 441 and the first bypass flow path 431 instead of the opening and closing valve 484. The first filter valve assembly may guide at least a portion of the water flowing along the first internal flow path 441 to a filter 460 side through the three-way valve.

For reference, it may be preferable that a pressure at a second bypass flow path 432 side is lower than a pressure at a first bypass flow path 431 side for the water in the first internal flow path 441 to be smoothly guided to the filter 460. However, even when such a pressure relationship is not satisfied, a small amount of the water in the first internal flow path 441 may be bypassed to the filter 460. In the present embodiment, because the water continues to circulate along the circulation flow path F, even when a small amount of the water is supplied to the filter 460 as described above, the ionic material in the water may be lowered to the required level.

In one example, when the amount of the ionic material in the water flowing along the circulation flow path F is identified to be a preset first reference amount, the controller may control the first filter valve assembly 484 such that bypass of the water starts. For example, when a TDS of the water obtained by a TDS sensor 491 is identified to be a preset first reference TDS, the controller may control the opening and closing valve 484 to allow the water in the first internal flow path 441 to flow into the filter 460. When such bypass is started, the TDS of the water will gradually be lowered. Further, the controller may control the opening and closing valve 484 such that the bypass of the water continues until the amount of the ionic material in the water flowing along the circulation flow path F is reduced to a preset second reference amount. Through the control as described above, the boiler of the present embodiment may keep the amount of the ionic material in the water at a required low level.

The filter module 400 may further include an opening and closing valve 483 for opening and closing the discharge flow path 434. When discharge of the reclaimed water is required, the filter module 400 may open the opening and closing valve 483 through control by the controller. For example, when the regeneration mode is required during the removal mode, the filter module 400 may close the opening and closing valve 484 and open the opening and closing valve 483 to discharge the reclaimed water to the outside.

For reference, the opening and closing valve 483 and the opening and closing valve 484 may be replaced by a three-way valve disposed at a connection point of the second bypass flow path 432 and the discharge flow path 434.

Sensing Device

The filter module 400 of the present embodiment may further include the sensing device 491 for sensing the TDS (total dissolved solid) of the water to obtain the amount of the ionic material in the water. The sensing device is disposed on one of the first and second internal flow paths 441 and 442 to sense the TDS of the water flowing along the flow path on which the sensing device is installed.

The sensing device of the present embodiment includes the TDS sensor 491 disposed on the second internal flow path 442 as shown in FIG. 12. When the TDS sensor 491 is installed as such, a time point for activating the removal mode is able to be determined based on the TDS of the water returned to the boiler. In addition, because the TDS sensor 491 is disposed inside the filter case 410, whether to operate the filter 460 may be determined by the filter module 400 itself.

Variant

Figure 13:
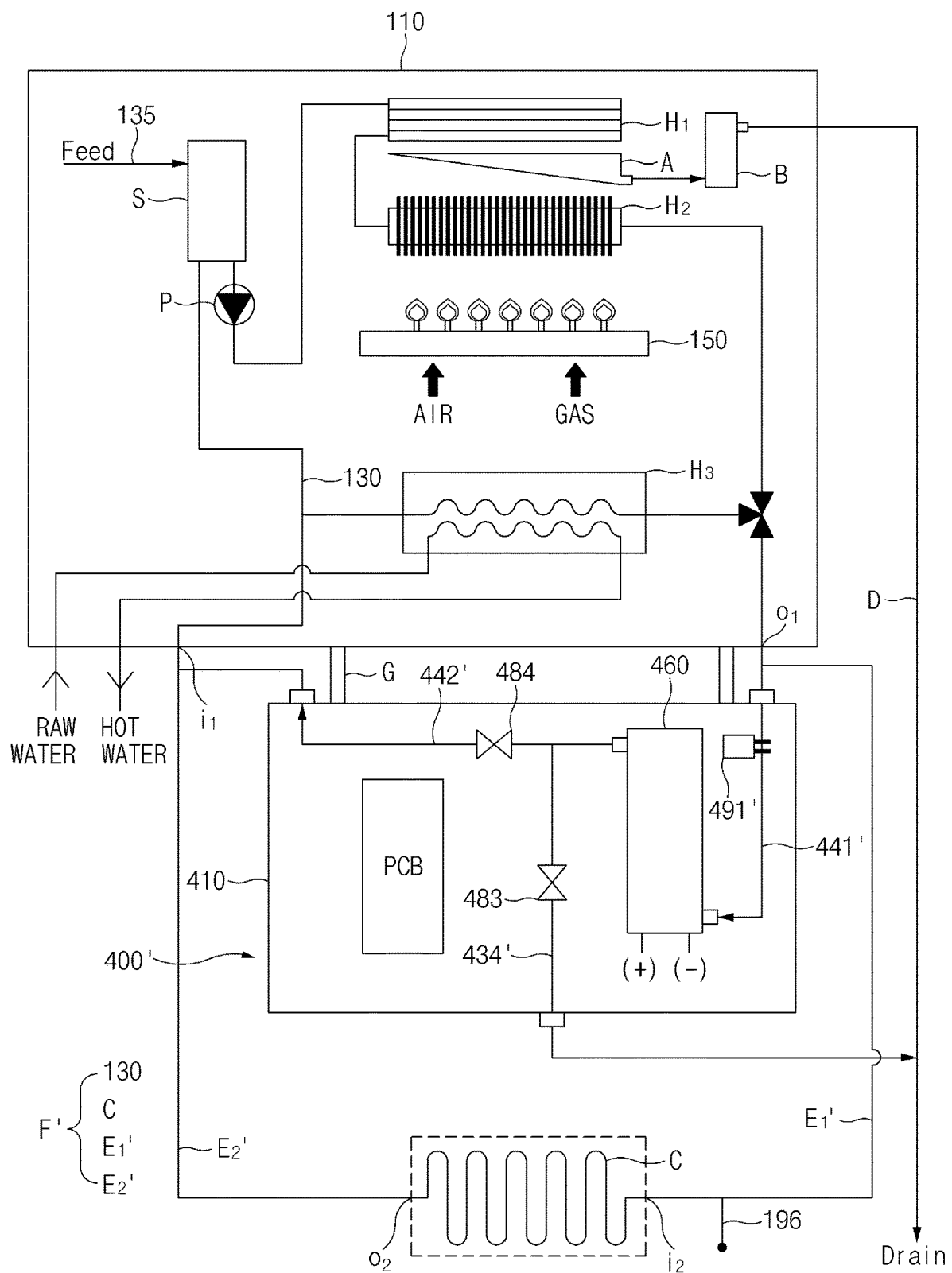
FIG. 13 is a conceptual diagram conceptually illustrating a first variant of a boiler according to Embodiment 7 of the present disclosure.

In one example, the boiler according to Embodiment 7 may be modified as shown in FIG. 13. FIG. 13 is a conceptual diagram conceptually illustrating a first variant of a boiler according to Embodiment 7 of the present disclosure. The boiler of the present variant has a basic difference from the boiler of Embodiment 7 in the flow path of the filter module.

In the present variant, a filter module 400' includes a first internal flow path 441' communicating a first connection flow path $E_1$' and the inlet of the filter 460 with each other, and a second internal flow path 442' communicating a second connection flow path $E_2$' and the outlet of the filter 460 with each other instead of the first and second internal flow paths 441 and 442 and the first and second bypass flow paths 431 and 432 of Embodiment 7.

In this connection, the first connection flow path $E_1$' is a flow path connecting one of the inlet $i_1$ and the outlet $o_1$ of the main flow path 130 with one of the inlet $i_2$ and the outlet $o_2$ of the heating flow path C, and the second connection flow path $E_2$' is a flow path connecting the other one of the inlet $i_1$ and the outlet $o_1$ of the main flow path 130 with the other one of the inlet $i_2$ and the outlet $o_2$ of the heating flow path C. For example, as shown in FIG. 12, the first connection flow path $E_1$' is a flow path communicating the outlet $o_1$ of the main flow path 130 with the inlet $i_2$ of the heating flow path C, and the second connection flow path $E_2$' is a flow path communicating the inlet $i_1$ of the main flow path 130 with the outlet $o_2$ of the heating flow path C.

The above connection or communication may be implemented indirectly. For example, the first internal flow path 441' may extend outwardly of the filter case 410 and be connected to the first connection flow path $E_1$', and an additional flow path may be disposed between the first internal flow path 441' and the first connection flow path $E_1$'.

In the present embodiment, the water may circulate through the main flow path 130, the first connection flow path $E_1$', the heating flow path C, and the second connection flow path $E_2$', that is, through a circulation flow path F'. When filtering is required during the circulation, the water in the circulation flow path F' may be supplied to the filter 460. For example, when performing of the removal mode is required, the controller may open the opening and closing valve 484 to allow at least a portion of water discharged from the outlet $o_1$ of the main flow path 130 to be supplied to the filter 460. When performing of the regeneration mode is required during the performance of the removal mode, the controller may close the opening and closing valve 484 and open the opening and closing valve 483 to allow the reclaimed water to be discharged out of the filter module 400.

For reference, instead of the opening and closing valve 484 and the opening and closing valve 483, the boiler of the present variant may include a three-way valve disposed at a point branched from the first connection flow path $E_1$' to the first internal flow path 441', and may include a three-way valve disposed at a connection point of the second internal flow path 442' and a discharge flow path 434'. The boiler of the present variant may include a TDS sensor 491' on the first internal flow path 441'.

In one example, the filter module 400 according to Embodiment 7 or the filter module 400' according to the variant of Embodiment 7 may be applied to the water heater such as the hot water supplier and the like as well as the boiler.

Embodiment 8

Figure 14:
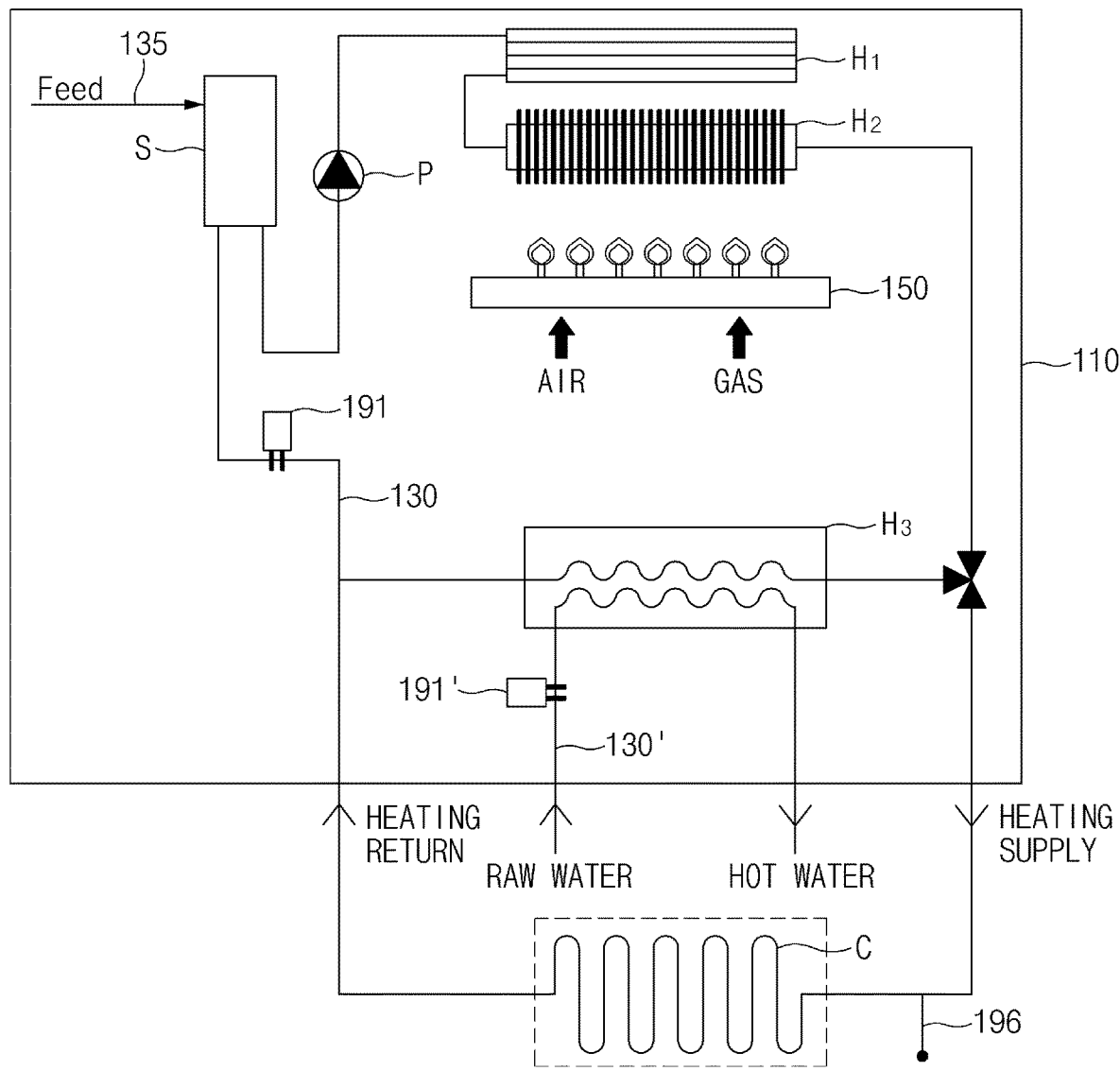
FIG. 14 is a conceptual diagram conceptually illustrating a boiler according to Embodiment 8 of the present disclosure.

FIG. 14 is a conceptual diagram conceptually illustrating a boiler according to Embodiment 8 of the present disclosure.

The boiler according to the present embodiment includes the boiler case 110, the main flow paths 130 and 130', the heat source 150, and sensing devices 191 and 191', as shown in FIG. 14. Hereinafter, the sensing device 191 among the above components will be mainly described.

The sensing devices 191 and 191' respectively obtain amounts of an ionic material contained in water flowing along the main flow paths 130 and 130' or in water to be supplied to the main flow paths 130 and 130'. To this end, the sensing devices 191 and 191' may include a TDS sensor for sensing the TDS of the water. The description of the sensing device of Embodiment 1 may be equally applied to the sensing device of the present embodiment.

The TDS sensor 191 may be installed on the main flow path 130 to sense the TDS of the water flowing along the main flow path 130. Alternatively, the TDS sensor 191' may be installed on the main flow path 130' for generating hot water to sense the TDS of the water flowing along the main flow path 130'. Alternatively, the TDS sensor 191 may be installed on the supply flow path 135 or installed in the expansion tank S as will be described below to sense the TDS of the water to be supplied to the main flow path 130.

In one example, the boiler further includes the heat exchangers $H_1$ and $H_2$ for heating the water using the sensible heat of the heat source 150 or the condensed latent heat of the exhaust gas generated from the heat source 150. The occurrence of the scale is primarily a problem in the heat exchanger. Accordingly, as shown in FIG. 14, the TDS sensor 191 may be installed on the main flow path 130 on a upstream side of the heat exchangers $H_1$ and $H_2$ with respect to the flow direction of the water flowing along the main flow path 130 to determine the TDS of the water flowing into the heat exchanger.

Alternatively, the TDS sensor may be installed on the main flow path 130 to be adjacent to the inlet (see $i_1$ in FIG. 13) of the main flow path 130 to determine the TDS of the water flowing into the boiler.

Alternatively, the TDS sensor may be disposed inside the expansion tank S. A flow velocity may be relatively low in the expansion tank S compared with the main flow path 130. Accordingly, when the TDS sensor 191 is disposed to be submerged in the water in the expansion tank S, a probability of error in the measurement of the TDS of the water resulted from a high flow velocity may be reduced. As described in the foregoing embodiment, the expansion tank S is the tank disposed inside the boiler case 110 to receive the volume expansion of the water generated due to the temperature rise.

Because the boiler of the present embodiment includes the sensing devices 191 and 191', the boiler may obtain the amounts of the ionic material contained in the water flowing along the main flow paths 130 and 130' or in the water to be supplied to the main flow paths 130 and 130'.

The amount of the ionic material may be an indicator indicating a possibility of occurrence of a problem in the boiler because of the occurrence of the scale. For example, when a large amount of the ionic material is contained in the water, a possibility of the occurrence of the scale is high because of the calcium ions and the like, so that the possibility of the occurrence of the problem in the boiler may also be high. Thus, when the amount of the ionic material is obtained as in the boiler of the present embodiment, it will be identified in advance that the problem will be occurred in the boiler because of the occurrence of the scale. This allows a necessary measure to be taken for the boiler before a durability of the boiler deteriorates or a life of the boiler decreases. Further, this allows, after a failure of the boiler occurs, whether the failure is due to a water quality of the water supplied to the boiler or whether there is another reason to be identified.

In one example, the boiler of the present embodiment may further include a controller (not shown) for determining an expected life of the boiler based on the TDS of the water obtained by the TDS sensor 191. The expected life of the boiler based on the TDS of the water may be identified in advance through experimental methods and the like. For example, information about a total amount of scale fixed to the boiler in which the problem actually occurred may be obtained and information about an amount of scale fixed to the boiler for each operating time may be experimentally obtained based on the TDS of the water supplied to the boiler to identify the expected life of the boiler based on the TDS of the water in advance.

Based on the table identified as such, the controller may predict a remaining life of the boiler based on the water TDS. For example, when water with TDS, which is equal to or lower than a standard TDS set in a range considered in a design, is continuously supplied, the boiler is able to be used for a defined life. However, when the TDS of the water supplied to the boiler is higher than the standard TDS, because the life of the boiler is likely to decrease due to the occurrence of the scale, the boiler will be used less than the defined life. The controller may determine the expected life as above based on the table and the like.

The controller may determine the expected life when the water is newly supplied to the main flow path 130 or to the heating flow path C, for example, when the water (the heating water) is first supplied to the main flow path 130 or additionally supplied after the initial supply. This is because, when the water is newly supplied, the precipitation/fixation of the calcium carbonate mainly occurs initially.

In addition, the controller may determine whether to end cleaning when the main flow path 130 or the heating flow path C is cleaned. For example, during the cleaning of the main flow path 130 or the heating flow path, the TDS changes because of a substance used for the cleaning. Such a change may be obtained through the TDS sensor 191. During the change of the TDS, the controller may determine that the cleaning is completed when the TDS obtained by the TDS sensor 191 reaches a predetermined reference TDS. For example, when a general TDS of the water (the tap water) supplied to the boiler is 150 ppm, and when a certain substance (e.g., a phosphate or chelating agent) is input for the cleaning, the TDS may increase to 500 to 600 ppm. However, when the water continues to drain during the cleaning (flushing), the TDS may be lowered back to 150 ppm. When the TDS is lowered as such, for example, when the TDS is lowered to the TDS of the general water, the controller may determine that the cleaning is completed and an entirety of the predetermined substance is removed. When it is determined that the cleaning is completed, completion of the cleaning may be displayed through a display to be described later.

For reference, the controller may receive TDS values obtained for a plurality of times by the TDS sensor 191 and determine the TDS of the water as an average value of the obtained TDS values. For example, the controller may determine the TDS of the water as an average value of TDS values obtained for two or three times at predetermined time intervals by the TDS sensor 191. This lowers a possibility of obtaining a wrong TDS of the water.

In one example, the boiler of the present embodiment may further include the display (not shown) that displays the TDS of the water obtained by the TDS sensor 191 and the expected life determined by the controller. This allows a user to easily identify the relevant information. The display may be conventional display means.

In addition, the boiler of the present embodiment may further include a notification device (not shown) for generating a visual or audio notification when the TDS of the water obtained by the TDS sensor 191 is equal to or greater than a predetermined allowable TDS. As described above, when the TDS of the water supplied to the boiler is equal to or greater than the predetermined standard TDS, the water may adversely affect the durability and the life of the boiler. Thus, the user may take the necessary measure before the failure occurs by notifying the user via the notification device that the problem is more likely to occur because the TDS of the water is equal to or greater than the predetermined allowable TDS.

The notification as described above may be made visually or audibly, such as lighting of lights, sound generation, or the like. Alternatively, a warning message may be displayed on the aforementioned display. The controller described above may determine whether the TDS of the water obtained by the TDS sensor 191 is equal to or greater than the predetermined allowable TDS. For reference, the allowable TDS may be approximately 200 ppm.

In one example, the boiler of the present embodiment may further include storage (not shown) that stores the TDS of the water obtained by the TDS sensor 191. This allows the user or an inspector to identify a TDS history of the water supplied to the boiler at any time.

The storage may further store a water temperature and a boiler usage time in addition to the TDS of the water. To this end, the boiler of the present embodiment may further include a temperature sensor for obtaining the temperature of the water flowing along the main flow path 130. The boiler usage time may be identified as a time from when the user starts to operate the boiler to when the user ends the operation of the boiler. When the sensing device 191 of the present embodiment is applied to the hot water supplier, the storage may also store an amount of water used as the hot water.

The TDS of the water, the temperature of the water, the boiler usage time, the used amount of the water, and the like are factors that influence the occurrence of the scale. Therefore, when the factors as described above are stored, the factors help predict the occurrence of the failure or determine the cause of the failure. The controller may also determine a usage pattern of the boiler based on such factors.

The determination of the usage pattern of the boiler is very useful for predicting the occurrence of the failure or identifying the cause of the failure. For example, when the water temperature rises slower than before or when the amount of the water discharged as the hot water is reduced when water with an arbitrary TDS is used for an arbitrary time period at an arbitrary temperature, it may be determined that the failure (e.g., a failure of occurrence of leakage because of a crack) occurred at that time point. Alternatively, which usage pattern will occur in the boiler may be identified before the failure as described above occurs, so that it may be predicted that the failure may occur soon when such usage pattern appears.

The above description of Embodiment 8 may be applied to the above-described embodiments or variants. In addition, the contents described in Embodiment 8 may be applied to the water heater such as the hot water supplier and the like as well as to the boiler.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The invention claimed is:

1. A scale-free boiler comprising:
   a main flow path configured to allow water to flow;
   a heat source for heating the water;
   a filter for removing, based on an electrical force, an ionic material contained in the water to prevent occurrence of scale;
   a first flow path diverging from the main flow path for communicating the main flow path and an inlet of the filter with each other for bypassing at least a portion of the water flowing along the main flow path to the inlet of the filter;
   a second flow path diverging from the main flow path for communicating the main flow path and an outlet of the filter with each other for returning at least a portion of the water discharged from the outlet of the filter to the main flow path;
   a first valve assembly for bypassing the at least the portion of the water flowing along the main flow path to the first flow path; and
   a controller configured to control the first valve assembly based on an amount of the ionic material in the water, wherein the controller is further configured to:
      control the first valve assembly to bypass some or all of the water flowing along the main flow path to the first flow path when removal of the ionic material is required; and
      control the first valve assembly to allow all of the water flowing along the main flow path to continue flowing along the main flow path when removal of the ionic material is not required.

2. The scale-free boiler of claim 1, wherein the filter selectively activates one of a removal mode for removing the ionic material in the water through an electrode and a regeneration mode for regenerating the electrode.

3. The scale-free boiler of claim 2, wherein
   a connection point between the second flow path and the main flow path is disposed downstream of a connection point between the first flow path and the main flow path with respect to a flow direction of the water flowing along the main flow path, and
   the water flows into the filter from the main flow path through the first flow path in the removal mode, and the water returns to the main flow path from the filter through the second flow path after the removal of the ionic material by the filter.

4. The scale-free boiler of claim 3, further comprising:
   a drain flow path for communicating the inlet of the filter and an outside of a boiler case with each other,
   wherein the water flows into the filter from the main flow path through the second flow path in the regeneration mode, and the water drains from the filter through the drain flow path together with the ionic material desorbed from the electrode of the filter.

5. The scale-free boiler of claim 3, further comprising:
   a drain flow path for communicating the outlet of the filter and an outside of a boiler case with each other,
   wherein the water flows into the filter from the main flow path through the first flow path in the regeneration mode, and the water drains from the filter through the drain flow path together with the ionic material desorbed from the electrode of the filter.

6. The scale-free boiler of claim 3,
   wherein the controller is configured to control the first valve assembly such that the bypass of the water continues except during the regeneration mode until the amount of the ionic material in the water flowing along the first flow path or flowing along the main flow path before being bypassed to the first flow path is decreased to a preset target amount.

7. The scale-free boiler of claim 3, wherein the first valve assembly is configured to control a bypass flow rate, the bypass flow rate being a flow rate of the water bypassed to the first flow path.

8. The scale-free boiler of claim 7, wherein the controller is configured to adjust the bypass flow rate based on a removal rate defined by Equation 1 below through control for the first valve assembly:

$$\text{Removal rate} = \frac{A_{in} - A_{out}}{A_{in}} \quad \text{[Equation 1]}$$

where $A_{in}$ is the amount of the ionic material in the water flowing along the first flow path, and $A_{out}$ is the amount of the ionic material in the water flowing along the second flow path.

9. The scale-free boiler of claim 8, wherein the controller is configured to:
decrease the bypass flow rate by controlling the first valve assembly to increase the removal rate; or
increase the bypass flow rate by controlling the first valve assembly to decrease the removal rate.

10. The scale-free boiler of claim 7, wherein the controller is configured to adjust the bypass flow rate based on a residual amount, which is the amount of the ionic material in the water discharged from the filter and flowing along the second flow path through the control of the first valve assembly.

11. The scale-free boiler of claim 10, wherein the controller is configured to:
decrease the bypass flow rate by controlling the first valve assembly to decrease the residual amount; or
increase the bypass flow rate by controlling the first valve assembly to increase the residual amount.

12. The scale-free boiler of claim 3, further comprising:
a pump for forcing a flow of the water in the main flow path,
wherein the pump is disposed on the main flow path to be adjacent to the first flow path, and the pump is disposed upstream of the connection point between the first flow path and the main flow path with respect to the flow direction of the water.

13. The scale-free boiler of claim 2, further comprising:
a pump for forcing a flow of the water in the main flow path; and
a heat exchanger for heating the water in the main flow path,
wherein the heat exchanger is located on a downstream side of the pump with respect to a flow direction of the water flowing along the main flow path,
wherein the first flow path is in communication with the main flow path at a position at the downstream side of the pump and an upstream side of the heat exchanger, and
wherein the second flow path is in communication with the main flow path at a position at a downstream side of the heat exchanger but an upstream side of the pump.

14. The scale-free boiler of claim 2, further comprising:
a sensible heat exchanger for heating the water using sensible heat of the heat source;
a latent heat exchanger for heating the water using condensed latent heat of exhaust gas generated from the heat source;
a condensed water collecting container for storing condensed water generated in the latent heat exchanger; and
a drain flow path for draining the water flowed into the filter together with the ionic material desorbed from the electrode of the filter in the regeneration mode,
wherein at least a portion of the water drained through the drain flow path is supplied to the condensed water collecting container.

15. The scale-free boiler of claim 2, further comprising:
a supplementary flow path for supplying the water supplied from an outside of a boiler case to the filter,
wherein the water supplied to the filter in the regeneration mode is the water supplied from the main flow path through the first flow path or the second flow path, or the water supplied from the outside of the boiler case through the supplementary flow path.

16. A scale-free water heater comprising:
a main flow path configured to allow water to flow;
a heat source for heating the water;
a filter for removing, based on an electrical force, an ionic material contained in the water;
a first flow path diverging from the main flow path for communicating the main flow path and an inlet of the filter with each other for bypassing at least a portion of the water flowing along the main flow path to the inlet of the filter;
a second flow path diverging from the main flow path for communicating the main flow path and an outlet of the filter with each other for returning at least a portion of the water discharged from the outlet of the filter to the main flow path;
a first valve assembly for bypassing the at least the portion of the water flowing along the main flow path to the first flow path; and
a controller configured to control the first valve assembly based on an amount of the ionic material in the water,
wherein the controller is further configured to:
control the first valve assembly to bypass some or all of the water flowing along the main flow path to the first flow path when removal of the ionic material is required; and
control the first valve assembly to allow all of the water flowing along the main flow path to continue flowing along the main flow path when removal of the ionic material is not required.

* * * * *